US008387141B1

(12) United States Patent
Zhukov et al.

(10) Patent No.: US 8,387,141 B1
(45) Date of Patent: Feb. 26, 2013

(54) SMARTPHONE SECURITY SYSTEM

(75) Inventors: Igor Zhukov, Moscow (RU); Alexander Zuykov, Moscow (RU); Dmitry Mikhailov, Moscow (RU)

(73) Assignee: Green Head LLC, Moscow (RU)

( * ) Notice: Subject to any disclaimer, the term of this patent is extended or adjusted under 35 U.S.C. 154(b) by 0 days.

(21) Appl. No.: 13/563,769

(22) Filed: Aug. 1, 2012

Related U.S. Application Data

(60) Provisional application No. 61/539,740, filed on Sep. 27, 2011.

(51) Int. Cl.
*H04L 29/06* (2006.01)
(52) U.S. Cl. ........................................ 726/22
(58) Field of Classification Search .............. 726/22
See application file for complete search history.

(56) References Cited

U.S. PATENT DOCUMENTS

| 7,162,715 | B1 * | 1/2007 | Whittaker et al. ............ 717/127 |
| 2005/0278620 | A1 * | 12/2005 | Baldwin et al. ............... 715/513 |
| 2007/0283438 | A1 * | 12/2007 | Fries et al. ...................... 726/24 |
| 2011/0047620 | A1 * | 2/2011 | Mahaffey et al. .............. 726/23 |

* cited by examiner

*Primary Examiner* — Michael S McNally
(74) *Attorney, Agent, or Firm* — Bardmesser Law Group

(57) ABSTRACT

System for protecting a mobile device against malware or harmful communications via calls and SMSs. A security module for a personal mobile device protects the device (and the user) against malicious communication, unauthorized access to resources and user private data, and against other security threats. The security module includes a combination of some or all of the following features: control of third-party applications, validation of the SMS sender's number, protection against fake contact name of the SMS sender, collection of data about fraudulent and spam SMS messages, robust sending of SOS SMSs and SOS e-mails with geographic coordinates of the mobile device, verification of validity of the base station, deletion of user data from a mobile device remotely, locking of a phone until the password is entered and filtering calls and SMS messages.

27 Claims, 15 Drawing Sheets

SMARTPHONE SECURITY SYSTEM

CROSS-REFERENCE TO RELATED APPLICATIONS

This application is a non-provisional of U.S. Patent Application No. 61/539,740, filed on Sep. 27, 2011, which is incorporated by reference herein in its entirety.

BACKGROUND OF THE INVENTION

1. Field of Invention

The present invention relates to telecommunication technology, and, more particularly, to protection of a mobile communication device against malware or harmful communications.

2. Background Art

Various anti-virus and security software is available today for protecting networks, servers and personal computers against at least some forms of malicious applications and malware.

However, mobile devices, such as smartphones, are also susceptible to malicious software. Modern smartphones access the Internet and perform a wide range of functions and, therefore, there is a wide range of possible types of attack by malware or other forms of malicious communications that can be launched against a mobile device.

For example, short messages can be sent from the victim's phone to paid numbers (i.e., Short Message Service), the victim can be signed up for a paid service by having an SMS sent from his number, the victim's personal data (i.e., contacts, messages, call logs, etc.) can be obtained and given to spammers, the victim's location can be obtained as well. Additionally, photo and video recording can be performed using the victim's phone.

Currently, personal mobile devices are not sufficiently protected. Accordingly, there is a need for effective protection of users of smartphones (or other personal mobile devices) against malware or other malicious attacks occurring on-line or via call (or SMS) communications.

SUMMARY OF THE INVENTION

The present invention is directed to method and system for protection of a mobile device against malware or harmful communications that substantially obviates one or several of the disadvantages of the related art.

In one aspect, there is provided a system, method and computer program product for protecting a mobile device against malware or harmful communications via calls and SMSs. According to an exemplary embodiment, security module for a personal mobile device protects the device (and the user) against malicious communication, unauthorized access to resources and private data, as well as against other security threats.

The security software includes a combination of one or more of the following features:

Control of third-party applications by re-assembling them, embedding custom code into them, and replacing calls of controlled functions by shell method calls;

Validation of the SMS sender's number by verifying that the sender's specified number and the SMSC (Short Message Service Center) number specified in the message's Protocol Description Unit (PDU) belong to the same Mobile Network Code (MNC);

Validation of the SMS sender's number by verifying it against Type of Number (TON) with a false number notification, if the number is an alphanumeric string with a correct phone number recorded in it;

Protection against fake contact name of the SMS sender by verifying if the sender's alphanumeric address is the same as the displayed name in all transliteration variants (the display_name field in the contacts content provider) and in all word subsets in the name;

Collection of data about fraudulent and spam SMS messages by enabling users to complain about unwanted messages using the software installed on the mobile device (i.e., mobile phone or smartphone);

Robust and simple sending of SOS SMSs and e-mails with a pre-set text and sending the geographic coordinates of the mobile device;

Verification of the validity of the base station (BS) the subscriber is connected to by searching coordinates of the current and adjacent base stations in the database, and comparing their locations and a certain maximum distance from each other;

Validation of the base station the subscriber is connected to by proportion of the signal level change for the current and nearby base stations;

Validation of the base station the subscriber is connected to, if Mobile Country Code (MCC) or MNC of the BS change, while the subscriber has not crossed a country border (in case of MCC), or has not changed service provider (if MNC has changed);

Identification of a fake BS, the subscriber is connected to, by a long BS handover when the subscriber is moving;

An automatic update of the BS database with new BS and update of previous coordinates by collecting statistics of the identified BS by user mobile devices and by adding a new BS, if it is identified several times by a certain number of different users;

Deletion of user data from a mobile device by: using the device administrator's Application Programming Interface (API) and by direct deletion of data from all available content providers;

Locking of a phone until the password is entered by: setting the password to unlock the device when switching the screen on, and by interception of all user key touches or a special activity;

Execution of certain actions when an SMS message with preset commands is received and hiding this message from the user;

Detection of the device being used by a person other than the device's owner, when a Subscriber Identification Module (SIM) card that is not the user's SIM card is inserted into the device;

Detection of entry of information about the user's SIM cards by advising the program that a new trusted card is going to be inserted;

Detection of other applications' use (or access) of the device's functions by attempting to use these functions resulting in their immediate release and processing situations when the system rejects the request;

Detection of encryption between the phone and the base station by querying the baseband processor using the respective AT (attention) command(s) (the Hayes command set) when an incoming or outgoing call is initiated to warn the phone operation system (e.g., Android OS) user that no encryption is being used;

Protection against SMS eavesdropping by third party programs by registration of the new message respective AT command from the baseband processor followed by waiting for the respective SMS at the system applications operation level;

Filtering calls and SMS messages by filtering the respective AT commands from the baseband processor;

Checking current status of the microphone and baseband processor to detect an unauthorized operation by means of external controlling commands and notification of the user about hidden audio transmission; and Protection against time manipulation by the user in order to extend the activation period by comparing the current system time, the end of the license term and Service Center Time Stamp (TP-SCTS) field value in the latest received SMS.

Additional features and advantages of the invention will be set forth in the description that follows. Yet further features and advantages will be apparent to a person skilled in the art based on the description set forth herein or may be learned by practice of the invention.

The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE INVENTION

Figure 1:
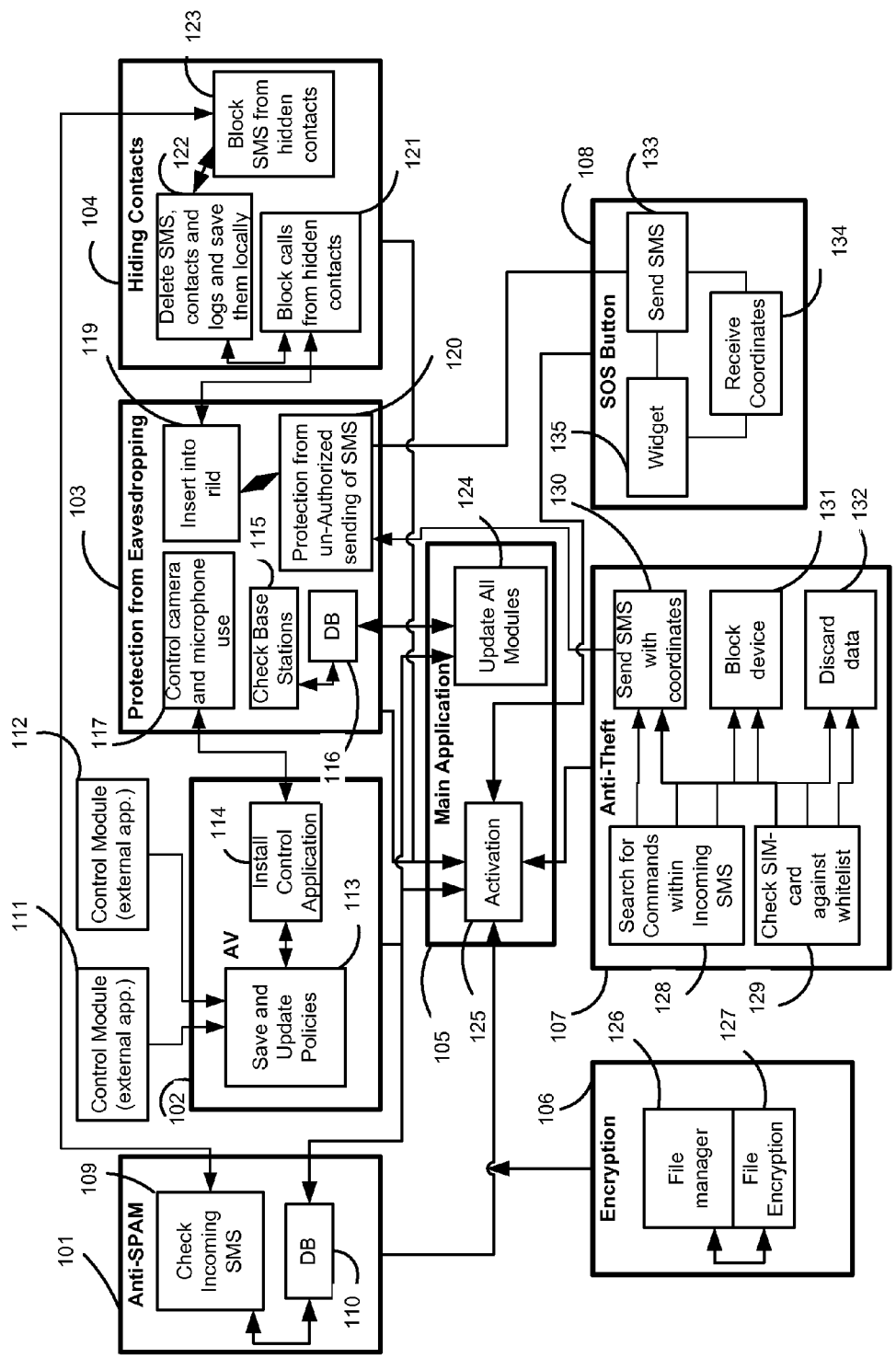
FIG. 1 illustrates a security system architecture, in accordance with the exemplary embodiment.

Reference will now be made in detail to the embodiments of the present invention, examples of which are illustrated in the accompanying drawings.

According to the exemplary embodiment, a system, method and computer program product for to protecting a personal mobile device (i.e., such as, for example, "smartphone" available to consumers).

Mobile devices are vulnerable to a number of security threats, some of which are particular to smartphones that are connected to the Internet. According to the exemplary embodiment, the security system (applications) guards the mobile phone from all various threats by the security features illustrated in FIG. 1.

According to the exemplary embodiment, the mobile device security system includes an anti-spam module 101, an antivirus (AV) module 102, an eavesdropping protection module 103, a contact hiding module 104, a main security module 105, an encryption module 106, an anti-theft module 107, and an SOS button utility 108.

The main security module 105 activates all the other modules using an activation component 125 and updates modules using an updating component 124. The anti-spam module includes a component 109 for checking incoming SMSs and a database 110 for storing the SMSs. The AV module 102 includes a policy component 113 for saving and updating the policies/rules and a utility 114 for installation of control over user applications that provides its service to component 117 that monitors use of camera and microphone. The policy component 113 receives updates from one or more external modules 111 and 112 (and others as needed).

The eavesdropping protection module 103 can include a utility 120 for protection against unauthorized SMSs. The utility 120 is connected with a module 119 for building custom functionality into a rild (Radio Interface Layer Daemon) level. Additionally, the eavesdropping protection module 103 has the component 117 that monitors camera and microphone use and a module 115 for checking BSs against a local database 116, and any other algorithms (such as heuristics) for checking for fake BS's.

According to the exemplary embodiment, the mobile device protection system also includes a module 104 for hiding contacts. A component 123 blocks SMSs from hidden contacts and a component 121 blocks calls from hidden contacts. A component 122 deletes SMSs, contacts and call logs and saves them locally.

The mobile device protection system includes the encryption module 106 that has a file manager 126 in communication with an encryption component 127. The anti-theft module 127 includes a component 128 for detecting commands within incoming SMSs and a component 129 for checking a SIM card against a whitelist. Additionally, it has a component 130 for sending SMS with coordinates of the mobile device (which are sent to a previously defined number that the user can access in the event his phone is lost or stolen), a component 131 for blocking (password-protecting) the mobile device and a component 132 for discarding all user data.

The mobile device protection system also includes a SOS button utility 108. The utility 108 has a widget 135, a component 133 for sending an emergency SMS and a component 134 for receiving coordinates. The widget initiates sending the SMS and receiving of the coordinates, the coordinates are sent by SMS. The functionality of the modules and components depicted in FIG. 1 is described in detail below. Note that the SMS component interfaces with the anti-eavesdropping module in a one-directional manner—SMS's sent by the SMS component are verified by the anti-eavesdropping component.

Figure 2:
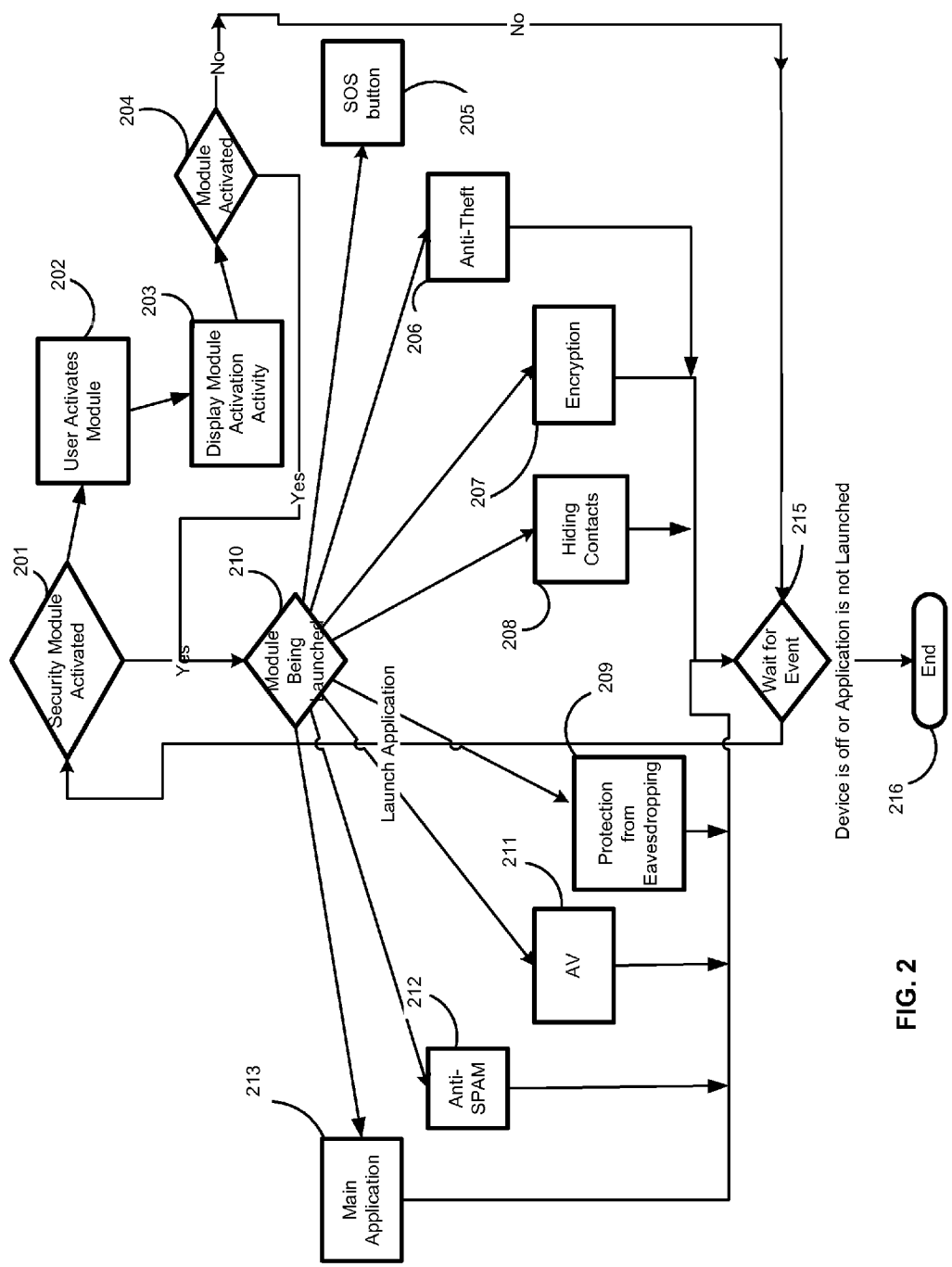
FIG. 2 illustrates a mobile device security system flowchart, in accordance with the exemplary embodiment.

FIG. 2 illustrates a mobile device security system flowchart, in accordance with the exemplary embodiment. The process checks if a security module is activated in step 201. If the module is not activated, a user activates the module in step 202. The module activation activity is displayed in step 203. Then, the process checks if the security module is activated in step 204. If the module is activated in step 204, the process checks if the module is launched in step 210. Otherwise, the process goes to step 215, where is waits for the next event.

If, in step 201, the security module is activated, then the module is launched in step 210. Once the security module is launched, it activates a main application 213, an anti-spam module 212, an AV module 211, a protection from eavesdropping module 209, a contact hiding module 208, an encryption module 207, an anti-theft module 206 or an SOS button utility 205. All of the above modules process an incoming message and wait for the next message in step 215. If the application is launched again, the process starts from step 201. Otherwise (i.e. if the application is uninstalled or the mobile device is turned off) the process ends in step 216.

Figure 3:
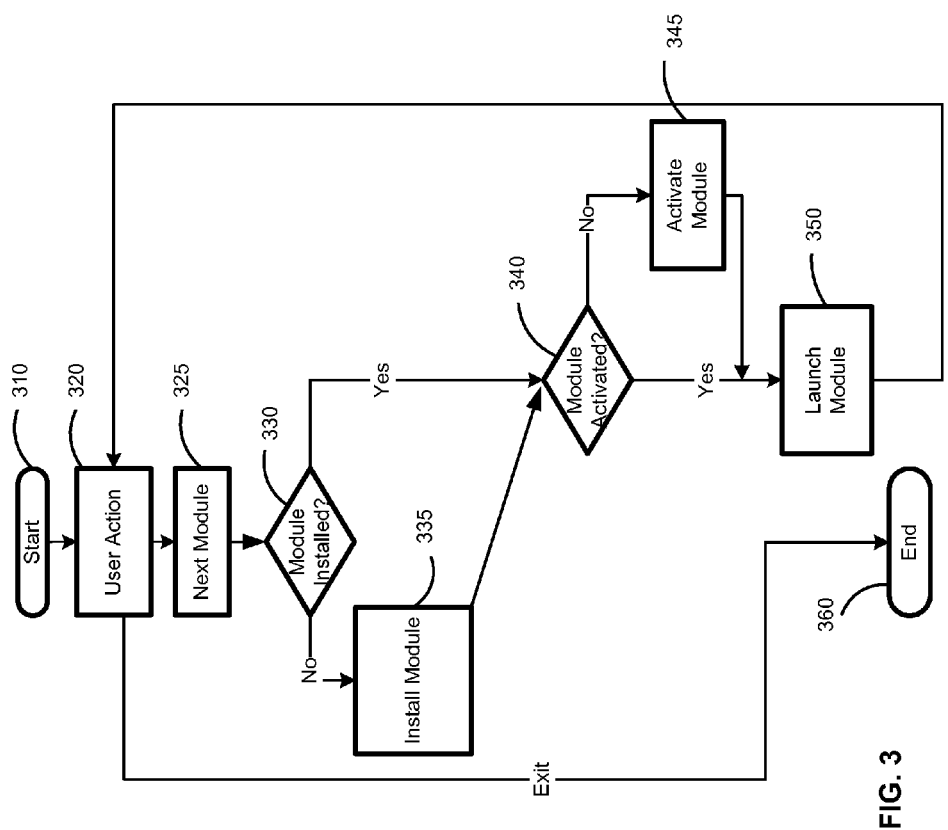
FIG. 3 illustrates sequential activation and launch of the security modules from the perspective of a user's entry point into the security system, in accordance with the exemplary embodiment.

FIG. 3 illustrates a (possibly) sequential activation of the security modules (i.e., the modules wait to be activated/launched), in accordance with the exemplary embodiment. The process starts in step 310 and user action is checked in step 320. If this user action requires launch of a security module, step 325 is executed. The process checks if the appropriate security module is installed in step 330. If the module is not installed, the system installs the module in step 335. If the security module is installed, the process checks if the module is activated in step 340.

If the module is activated, the process launches the module in step 350 and goes to another user action in step 320. Otherwise, the process activates the module in step 345. If the user action, in step 320, does not require a security module, the process ends in step 360.

According to the exemplary embodiment, the following security features are implemented.

1. Protection Against Date Manipulation.

The security application is activated for a certain time period. Therefore, it should be protected against system fraud by date manipulation in the phone's built-in clock. To ensure such protection, reliable information about the current time is supplied from a source that cannot be manipulated by the user. According to the exemplary embodiment, the application uses time stamps that SMS centers add to all messages (TP-SCTS field in PDU).

Once each incoming message has been received, the application saves its time stamp for future verifications. When activation is verified, the latest system time and date saved (or the maximum of these timestamps) are compared and their maximum is accepted as the current time. Apart from the SMS, every server communication session is used to update the current time. The server adds current time to each response during activation, update, etc.

The system of the exemplary embodiment includes protection against time manipulation by the user in order to extend the activation period by comparing the current system time, end of the license term and TP-SCTS field value in the latest received SMS.

2. Anti-Virus (AV) Operation.

The main AV operation principle is based on embedding of AV control code into the controlled applications. All potentially dangerous methods are wrapped into shell methods, which request AV policies with respect to the performed actions and call (or do not call) the target method based on these policies. The shell (wrapper) methods do not only call the particular methods, but also perform other security functions.

Note that the data may not be send to the AV. The AV displays a notification to the user and adds it to a log record. According to the exemplary embodiment, the policies are user permissions to perform certain actions with a particular application. User actions can be: allow, notify, block, or notify and block.

Control is established as follows. First, the .apk file (i.e., a zip archive, or an installation distributive file, or installation package) from the target application is decompressed. The .apk file is an installation file for Android. The .apk file contains executable code, resources (images, locations, etc.) and other application files. All Android applications are distributed and stored in .apk format.

A number of files can appear, however, the protection system is interested in two: classes.dex, which contains the application's executable code, and AndroidManifest.xml, which contains information about the application's components, required permissions and etc. Note that the exemplary embodiment is primarily targeted for Android OS, although other OSes are also within the scope of the invention.

The byte code of the classes.dex file is disassembled into the component classes, methods, members, etc., and a class with shell methods is added to it. Additionally, an auxiliary class is added to obtain the application's context (the AndroidManifest.xml file is modified accordingly). The context is a programmable object that is used for accessing Android environment, for example, for communication between applications.

Then, all calls of potentially dangerous methods are found in the disassembled code of the classes. They are then replaced by calls of shell methods with the same parameters and types of returned values. Subsequently, the "*.apk file" is assembled again and signed by a new generated signature that is unique for each application. Note that code obfuscation does not affect the exemplary system. In Java, only the names of user (custom) classes and methods (i.e. those not belonging to any library, framework, etc.) can be obfuscated, because-framework classes can be only called by their real names.

Then, the file is installed again. The initial "*.apk file" is backed-up if a restoration is needed.

According to the exemplary embodiment, the system controls third-party applications by re-assembling them, embedding custom code, and replacing calls of controlled functions by shell method calls. The custom code can request AV policies, request application context, process calls, generate error detection codes, etc.

Figure 5:
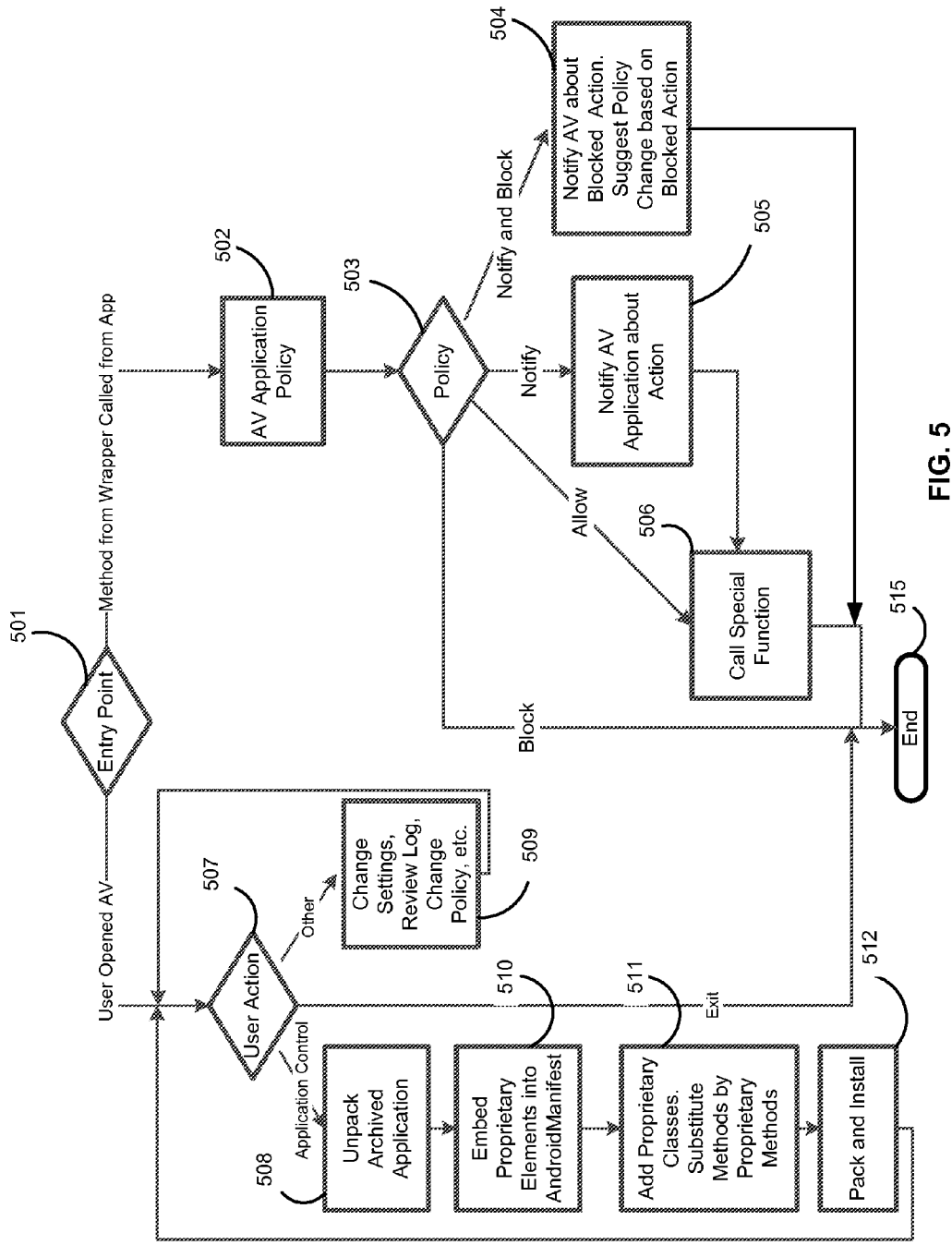
FIG. 5 illustrates implementation of AV application, in accordance with the exemplary embodiment.

FIG. 5 illustrates implementation of AV application as described above. The process initiates at an entry point 501, where a user opens an AV application, or a method from a shell (wrapper) is called from the application. In first case, user action is analyzed in step 507. If the user initiates application control, then archived application is unpacked in step 508. The process embeds proprietary elements into Android Manifest in step 510. The proprietary classes are added and the existing methods are substituted by proprietary methods in step 511. Subsequently, the process packs and installs the application in step 512. Then, the process moves to another user action in step 507.

In case, if the user executes other action in step 507, the settings and policies are changed, and log is reviewed in step 509. If the method from the wrapper class is called in step 501, the AV application policy is applied in step 502. In step 503 the process determines the policy. The policy can be any of: block action and end the process in step 515, allow and call a target function in step 506, notify AV application about the action in step 505, notify AV about blocked action and suggest an option for a policy change based on blocked action in step 504. Typically, there are four policies—Allow, Notify, Block and Notify, and Block. Here, the policy at issue is Notify and Block, where the intended action is not permitted, and the user is shown a window with a notification regarding the attempt. The user can select whether he wants to be notified of future attempts, and/or whether he permits such actions in the future by this application. Subsequently, the process ends in step 515.

3. Verifying Validity of SMS Sender Number.

Sender number validation is a function of an anti-spam module, in accordance to the exemplary embodiment. The anti-spam protects the user from many threats, which may result from third-party ability to send their messages in other mobile subscribers' names and in the operator's name. The sender's validation procedure is described in detail below.

The sender's address may have one of the following formats (TON—Type Of Number—in a PDU message):
  international number format (i.e., for example, +79251234567);
  alphanumeric—up to 11 Latin letters, digits and other characters (i.e., for example, www.megafon);
  other—short numbers (i.e., for example, 0123).

International numbers are validated by the SMSC (short message service center) number, which was used to deliver the message. Certain operators deliver messages with optional sender names. Therefore, they should have their own SMSCs, not those of the operators in whose names the messages are sent. For this reason, if the sender's number and SMSC number belong to different operators, then the message is deemed to be a fake. Such validation is also relevant, if the real subscriber sends the message while in a roaming mode and, consequently, while on another operator's network.

To identify the operator of a number, the application uses the database where telephone number prefixes match operator codes—MCC and MNC concatenation. The database can be assembled from open sources or Internet. Use of MCC+MNC combination as an operator code requires additional effort when creating a database. However, the combination makes it possible to compare the operator's SMSC with the code of the operator of the subscriber's SIM card (since MCC+MNC are included in the card's IMSI), which can be discovered unlike the user's phone number. Thus, it is possible to identify the mobile operator's messages without generation of false positive warnings (see Alphanumeric and other address types below).

If at least one number's prefix (out of the two numbers being verified—the sender's number and SMSC) is not found in the database, it is not possible to confirm the validity of the number. The warning "The sender's number might be fake" or similar will be provided to a user.

According to this exemplary embodiment, the system validates the SMS sender's number by verifying that the sender's specified number and the SMSC number specified in the message's PDU belong to the same MNC.

Alphanumeric addresses can be used for three types of fraudulent actions:
  masquerading as a name from the user's contact list;
  masquerading as a name that is not in the contact list (i.e., for example, MAMA);
  recording a digital number in a particular format (i.e., for example, the Android system processes addresses with any TON in the same manner; this broadens the range of mechanisms available to the attacker that are susceptible to phone book number masquerading).

Figure 4:
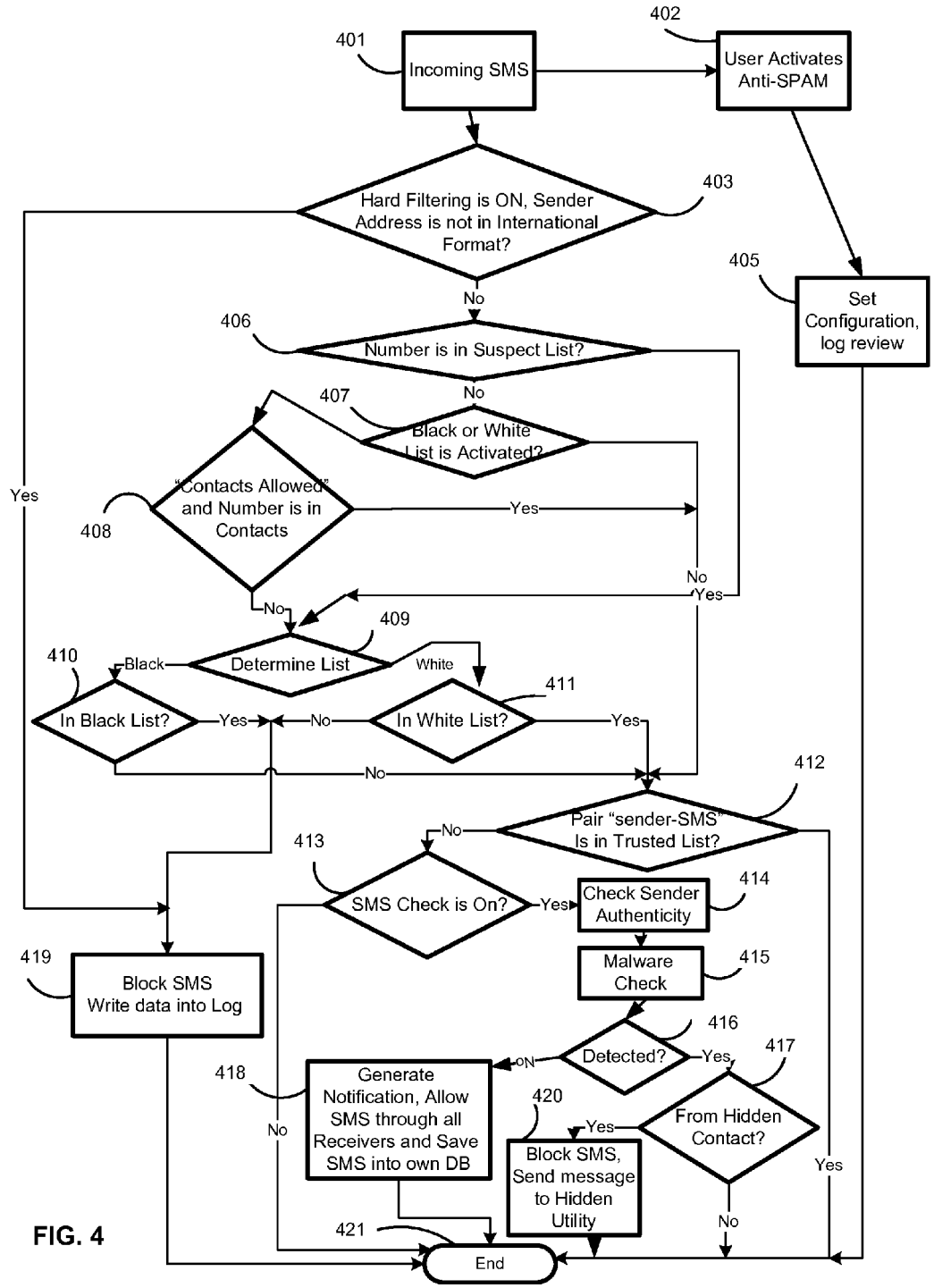
FIG. 4 illustrates security processing of incoming SMS using sender address and number, in accordance with the exemplary embodiment.

FIG. 4 illustrates security processing of incoming SMS using sender address and number. The security module is started in step 401 where various scenarios can occur. If the start was due to the user launching anti-spam module in step 402, the user can set configurations and review logs in step 405. Then, the process ends in step 421. If the start was due to an incoming SMS, then, in step 403, the process checks if hard filtering is on (where messages with alphanumeric numbers and short numbers are blocked) and if sender address is not in international format. If the number is not in international format, the SMS is blocked in step 419 and the data is written into a log. The process stops in step 421.

Otherwise, the process checks if the number is in a known suspect list in step 406. If the number is in the fraud list, the process goes to step 411 and determines whether the number is also in the user whitelist. If it is, the process goes to step 412, otherwise to step 419. If the number is not in the fraud list, the process checks if the blacklist or the whitelist filtering is enabled by the user in step 407. If filtering is disabled the process goes to step 412. Otherwise it checks if the "Contact Allowed" option is enabled and if the number is in Contacts. If both are true, the process goes to step 412. If any of the two clauses is false, a currently active checking mode is determined (based on user settings) in step 409: blacklist mode or whitelist mode. If the active mode is blacklist mode and the number is in the blacklist (step 410) or the active mode is whitelist mode and the number is not in the whitelist (step 411), the process blocks the SMS and writes SMS-related data into a log in step 419, after which the process ends in step 421. Otherwise the process checks if the pair "sender-SMSC" is in a trusted list in step 412. The trusted list is typically maintained and kept up to date by the software vendor, and is updated periodically on the user's side.

If the pair "sender-SMSC" is in the trusted list, the process ends in step 421. Otherwise, the process checks if the SMS check is on in step 413. If the SMS check is on the sender authenticity is checked in step 414. Then a malware/fraudulent text/malicious link check is performed in step 415. If, in step 416, the sender's authenticity is verified successfully and no malware or malicious link is detected, the process checks if the message came from a hidden contact in step 417. If the message does come from the hidden contact, it is blocked and sent to hidden contact module for further processing in step 420.

Otherwise, the process stops in step 421. If, in step 416, either sender authenticity is suspicious or malware, etc., is detected, a notification is displayed about the issue. Then the SMS is allowed to pass through other applications that can be registered to process new incoming text messages and saved into a local database (i.e., not allowed to reach the system Inbox) in step 418. Subsequently, the process ends in step 415. If the SMS check is not ON in step 413, the process ends in step 421.

According to an exemplary embodiment, the system validates the SMS sender's number by verifying it against the TON with a false number notification, if the number is alphanumeric with a correct phone number recorded in it.

According to an exemplary embodiment, the system provides protection against fake contact name of the SMS sender by verifying that the sender's alphanumeric address is the same as the displayed name in all transliteration variants (the display_name field in the contacts' content provider) and in all word subsets and/or transpositions in the name.

The exemplary embodiment can process other address types. Apart from the International and the Alphanumeric, there are the following TONs: Unknown, National, Network specific, Subscriber and Abbreviated. However, only Unknown (short numbers) is commonly used in practice. There are no verification rules for short numbers. Therefore, a general warning is given to the user (if SMSC belongs to a different operator than the operator of the SIM card's user): "Sender's number cannot be validated and may be a fake."

Note that the above verifications are made only, if the message arrives from an SMSC which is not the SMSC of the user's operator (picked up from the SIM card's IMSI).

4. Feedback Identification of Fraudsters and Spammers.

According to the exemplary embodiment, the anti-spam module has a feedback function that makes it possible for users to send unwanted messages that were not identified by the anti-spam module to the developers for inclusion in a central database (e.g., in a developers' or mobile operator's database) in order to place fraudster's numbers on blacklists. The system specialists, who maintain the server, receive notifications about all messages that have accumulated a certain number of complaints from different users, verify them and, if the SMSs are confirmed to be malicious, the sender's number is added to the blacklist.

When databases are updated the next time, the number is uploaded to all clients. Thus, the system of the exemplary embodiment includes collection of data about fraudulent and spam SMS messages by enabling users to complain about unwanted messages using the software installed on a mobile phone. Note that all messages marked by users go through manual moderation by system administrators.

Figure 6:
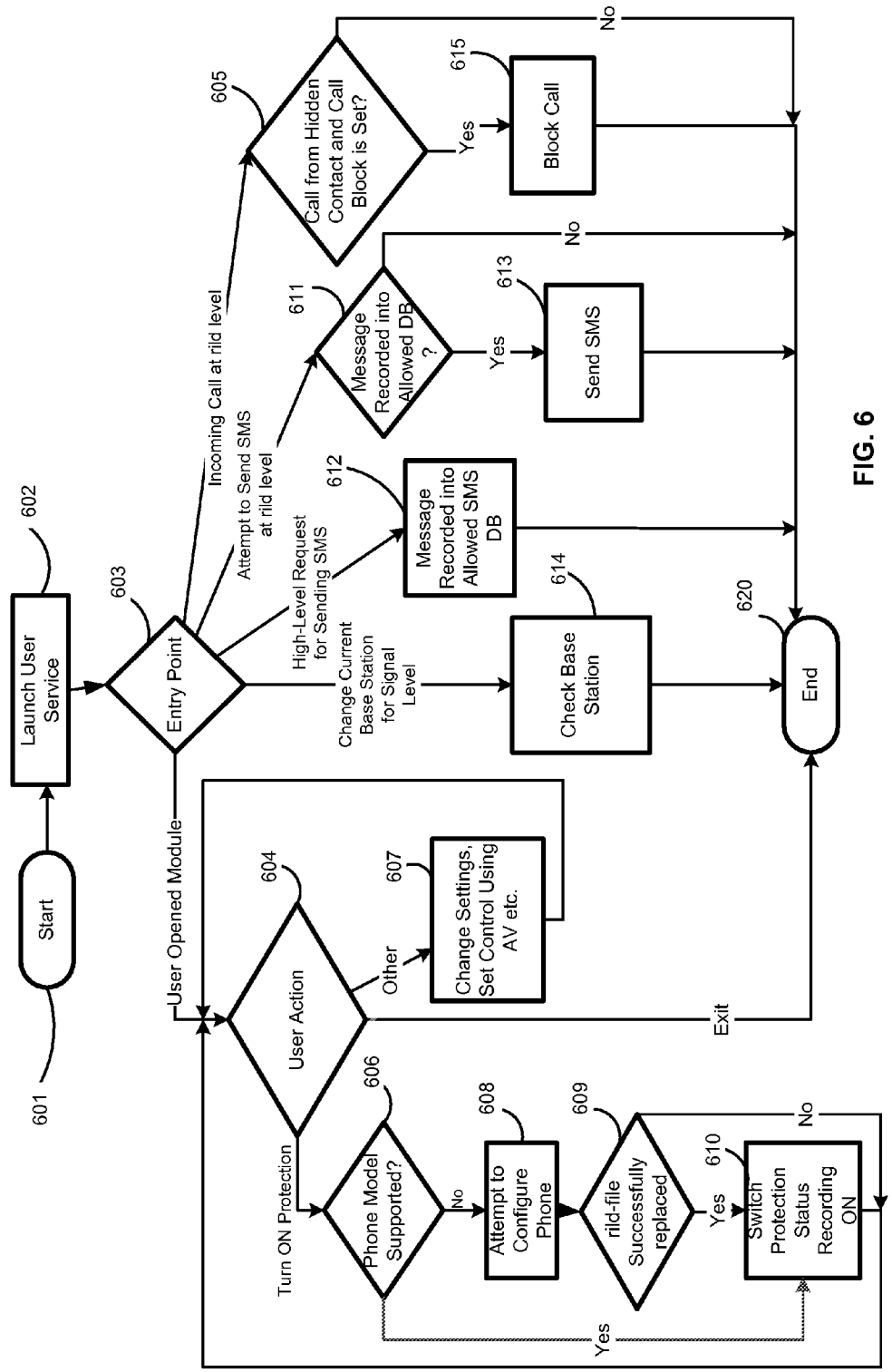
FIG. 6 illustrates security processing of incoming SMSs and calls, in accordance with the exemplary embodiment.

FIG. 6 illustrates security processing of incoming SMSs and calls, in accordance with the exemplary embodiment. The process initiates at step 601, where an SMS or a call comes in or the user opens the module. A user resident service starts in step 602. Then, the process moves to an entry point 603, where various scenarios can occur. If user opens a security module, he can take either one of two actions in step 604: turn on protection application or perform other action. If the user selects other action, the process goes to step 607, where the user can change settings, set control using AV module, etc.

Then the process moves to step 604 for another user action. If the user selects to turn on protection, then the process moves to step 606 to check if a phone model is supported. If the phone model is not supported, the process moves to step 610, where (partial) protection status recording is turned on. If the phone model is supported, the process attempts to configure the phone in step 608.

Then, in step 609, the process checks if the rild-file has been successfully replaced. If the rild-file has not been replaced, the process goes back to step 604 for another user action. Otherwise, the process moves to step 610, where protection status is turned on.

If in step 603 (at the entry point), the current base station (BS) or the signal level changes, the process checks the BS in step 614 and then ends in step 620. If the entry contains high-level request for sending SMS, the message is recorded into allowed SMS database in step 612. Then, the process ends in step 620. If the call attempts to send an SMS at rild level, the process moves to step 611, where it checks if the message has been recorded into allowed messages database. If the message has not been recorded, the process ends in step 620.

If the message has been recorded into the allowed messages database, the message is sent in step 613. Then the process ends in step 620. If the entry is an incoming call at rild level, the process checks, in step 605, if the call is from a hidden contact and a call block is set. If the call block is set, then the call is blocked in step 615. Subsequently, the process ends in step 620.

The exemplary system can also protect against SMS eavesdropping by third party applications by registration of the new message respective AT command from the baseband processor. Then, the system deals with the respective SMS at the level of the operation system applications. The system can further include filtering calls and SMS messages by filtering the respective AT commands from the baseband processor.

Figure 8:
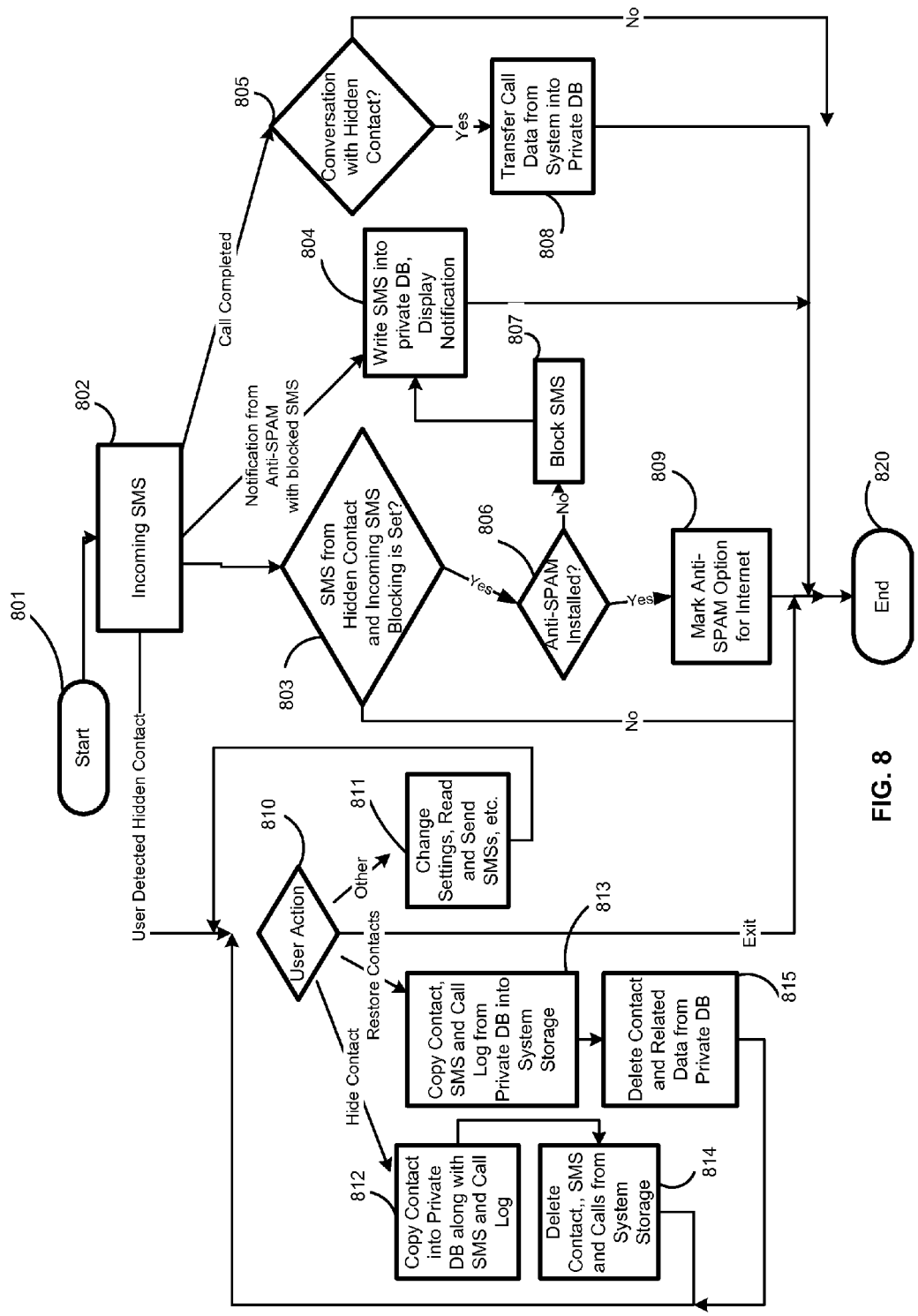
FIG. 8 illustrates security handling of SMSs in accordance with the exemplary embodiment.

FIG. 8 illustrates security handling of SMSs in accordance with the exemplary embodiment. The process is initiated in step 801. A scenario is chosen in step 802 based on the event that started the process. If a user has launched the contact hiding security module, the user takes action in step 810. If the user chooses to hide some contacts, these contacts are copied into a private database along with the SMS and call log in step 812. Then, the contact, SMS and call log are deleted from the system storage in step 814. If the user chooses to restore some contact, the contact information, SMS (with the contact) and the call log are copied from the private database into the system storage in step 813. Then, the contact and related data is deleted from the private database in step 815. If the user selects other action, they can change settings, read and send SMS, etc. in step 811. The process is repeated for each user action in step 810.

If the entry point is an incoming SMS and the process determines that the incoming SMS is from a hidden contact and a blocking function is set in step 803, it checks if the anti-spam is installed in step 806. Otherwise the process ends in step 820. If the anti-spam is not installed, the SMS is blocked in step 807. Otherwise a mark is left in the intent object (which is a message in Android OS) for the anti-spam in step 809. After the SMS is blocked in step 807, the SMS is written into the private database and notification is displayed in step 804.

If the user enters into a conversation with a hidden contact in step 805, the call data is transferred from the phone system into a private database in step 808. Subsequently, the process ends in step 820. Otherwise, the process ends after the step 805.

5. SOS Button

According to the exemplary embodiment, an SOS button is a widget for a smartphone home screen. The SOS button allows for quick sending of a pre-defined text and device coordinates to a pre-set number. In a dangerous situation, user only needs to press the widget (i.e., a button) and confirm sending. After that only send and delivery status notifications are displayed. The notifications remain in the notification line until removed by the user. This minimizes the required operations with the phone, making it possible to send the message secretly. Note that the SOS button is intended for extreme situations, when the user needs to call for help (in case of an attack) when he cannot use the phone openly. It is much easier to press the button while having a phone in the pocket than to type an SMS.

The transmission algorithm is executed as follows: the user confirms SOS sending; an SMS with a pre-defined text is sent immediately; then, if the message is delivered successfully, the mobile device starts waiting for location data; any new coordinates received by the mobile device are sent in a separate message (if more precise coordinates had not been sent earlier).

These messages can also be sent by e-mail. This exemplary embodiment includes a software component for a simple and robust sending of SMS and e-mails with a pre-defined text and geographic coordinates of the device.

Figure 11:
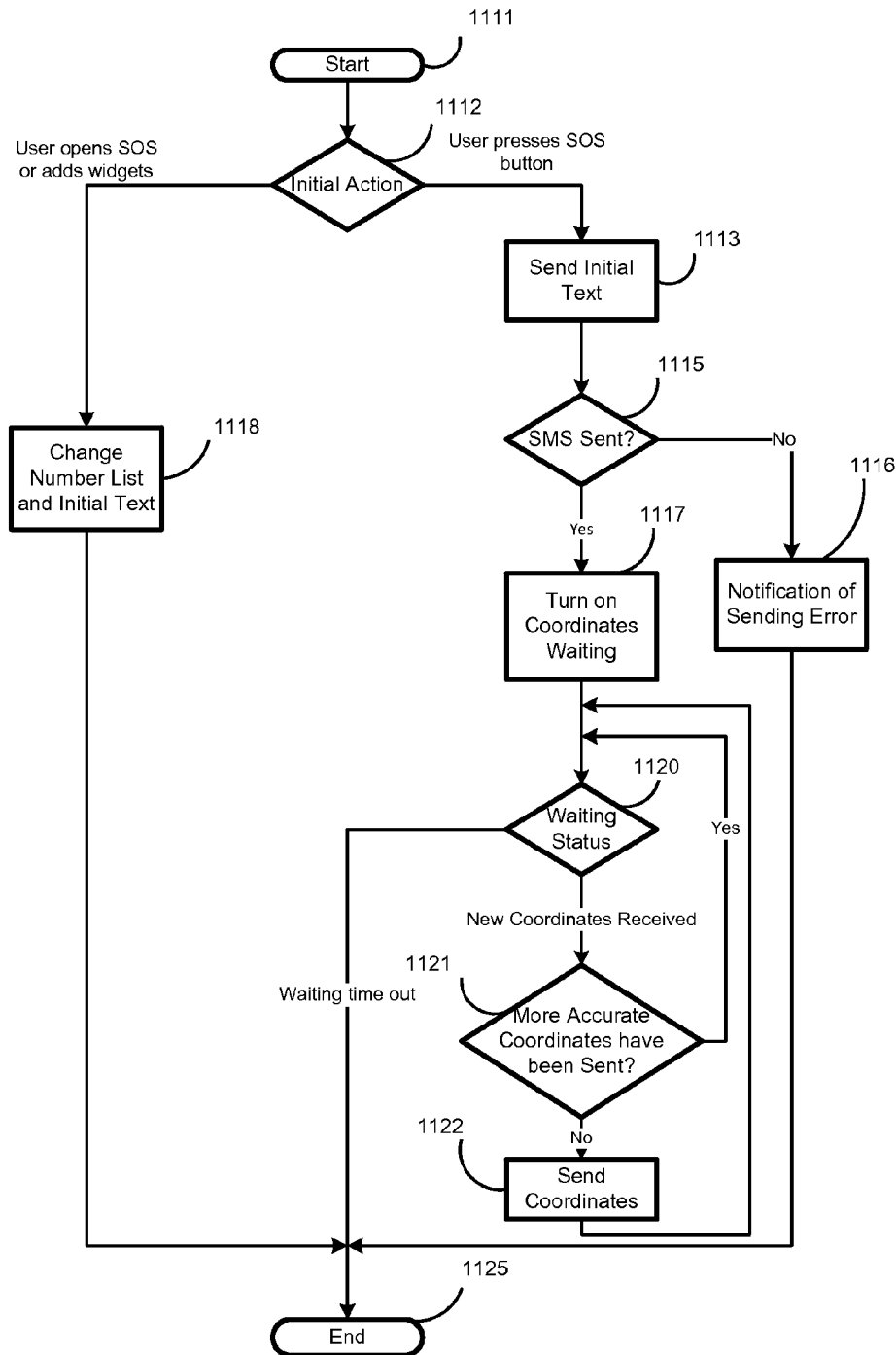
FIG. 11 illustrates a flow chart of a SOS button implementation, in accordance with the exemplary embodiment.

FIG. 11 illustrates a flow chart of a SOS button implementation, in accordance with the exemplary embodiment. A process is started in step 1111 and a user executes an initial action in step 1112. If the user presses an SOS button, the initial text is sent in step 1113. Then, in step 1115, the system checks if the SMS has been sent. If the SMS has not been sent, a notification of sending error is generated in step 1116 and the process ends in step 1125.

However, if in step 1115, SMS sending is confirmed, a coordinates waiting function (requesting the coordinates from the GPS chip, from base stations, local wi-fi points, etc.) is turned on in step 1117. A waiting status is determined in step 1120. If waiting time out is reached, the process stops in step 1125. Otherwise (i.e., new coordinates have been obtained), in step 1121, the process determines if more accurate coordinates have been sent. If more accurate coordinates have been sent, the process goes back to step 1120. Otherwise, the coordinates are sent in step 1122 and the process determines waiting status again in step 1120. If the user initial action in step 1112 is opening SOS application or adding a widget, then a list of numbers where the SOS message is sent and the initial text of the SOS message is changed in step 1118, after which the process ends in step 1125.

6. Identification of a Fake Base Station (BS).

Identification method for a fake BS is based on using a database of locations of cellular operators' base stations, identification of base station signal level changes and base station parameters changes during handovers, namely, country code (MCC) and network code (MNC). The database is updated with new base stations during operation, and locations of known base stations are updated as well. Note that the core of the database is taken from opencellid.org where the data is assembled by enthusiasts for open public use. The database is updated and corrected (as described below) because the original database taken from opencellid.org contains only about 60% of all base stations.

According to one exemplary embodiment, the validity of a BS is verified against the database of base stations. If coordinates of the current BS are found in the database, the BS validity verification starts with the comparison of the BS location to the subscriber's location. If the distance between them falls within certain limits, the subscriber is considered to be connected to the cellular operator's genuine BS. If a considerable difference between the BS location and the subscriber's location is identified, the BS is deemed to be a fake. Note that a maximum allowed difference in coordinates is 100 m, because this is an average margin of error in detection of caller coordinates by mobile phones.

According to this exemplary embodiment, the system verifies the validity of the BS, the subscriber is connected to by searching coordinates of the current and adjacent base stations in the database, comparing their locations and a certain maximum distance (e.g., 100 m) from each other.

According to another exemplary embodiment, the BS validation is performed based on a signal level. If the coordinates of the BS are missing in the database, the proportion of the signal level change for the current and adjacent BS is compared to previous values. If the signal level changes proportionally, the current BS is considered genuine. Otherwise, it is considered to be a fake. The system validates the BS the subscriber is connected to by proportion of the signal level change for the current and nearby base stations.

According to yet another exemplary embodiment, the BS validation is performed based on BS parameters. BS validation by the BS parameters takes place during the BS handover. At the time of the handover, the parameters of the previous BS are compared to the parameters of the current BS. Note that all of these actions are performed on a mobile device. If, during the handover, the BS is switched to a BS with a different MCC, the subscriber is asked if a country border has been crossed.

If the answer to this question is negative (i.e., the country border has not been crossed by the subscriber), the current BS is declared fake. Otherwise, the subscriber is connected to a genuine BS. In case of MNC change, the subscriber is asked if the communication operator has been changed. If the subscriber has not changed the service provider, the current BS is declared to be a fake.

Otherwise, the subscriber is connected to a genuine BS. According to this exemplary embodiment, the system performs validation of the base station the subscriber is connected to. For example, if MCC or MNC of the BS change and the subscriber has not crossed a country border (in case of MCC) or has not changed service provider (if MNC has changed), the current BS is deemed to be not genuine. In some cases, if the MCC or MNC changes without the subsequent change of country/operator, no extra validation is done.

According to yet another exemplary embodiment, long BS handover is used as a verification indicator. The long BS handover verification procedure is performed at a certain time interval. The following parameters are verified during this procedure: if a BS handover has actually occurred and if the subscriber has moved. If the subscriber has moved, but no BS handover took place, a warning is issued that the subscriber is probably connected to a fake base station. Otherwise, no warnings are provided to the subscriber.

Forgery protection of the base station to which the subscriber is connected is performed by forced connection of the mobile device to a base station that has a signal level below the maximum. This is implemented by sending respective AT commands to the baseband processor. Note that AT commands are commands for controlling a GSM-modem (i.e., the baseband processor).

According to the exemplary embodiment, the system identifies a fake base station the subscriber is connected to by forced connection of the mobile device to a base station that has a signal level lower than the maximum. Additionally, the system can perform identification of a fake BS the subscriber is connected to by a long BS handover when the subscriber is moving.

According to the exemplary embodiment, a BS database (located in the smartphone's application folder, for example) is updated with new base stations. The database update with new base stations is based on the signal level of the current and adjacent BS, if the coordinates of at least three adjacent base stations are known. The approximate location of the subscriber is calculated based on the coordinates of three adjacent BSs. The BS location, with respect to the subscriber, is determined based on the base station signal level change. BS coordinates are defined more precisely based on its signal level. Note that the signal level determines a weight of a given BS when coordinates of adjacent BSs are averaged out.

According to this embodiment, the system performs an automatic update of the BS database with new BSs and update of previous coordinates by collecting statistics of the BS identified by user mobile devices and adding new BS to the database, if it is identified several times by a certain number of different users. Each mobile device records coordinates of the BSs it connects to, if these BSs are not recorded in the database. When application updates are checked, the information is sent to the server. An MCC, MNC, Location Area Code (LAC) Cell ID (CID), altitude and longitude are sent for each of the BSs.

This date is recorded on the server into a special separate table (not into the BS database). If the coordinates for BS are already recorded, they are averaged out with the new ones. The IMEI (International Mobile Equipment Identity) of the device that sent BS-related data is also recorded. When a number of IMEI for particular BS reaches 100, the BS is considered verified and the data is moved into the database. From this point on, the BS-related data is given to the phones requesting database updates.

Thus, in order to add a fake BS into the database, 100 mobile devices along with 100 application licenses (for example) are required. Note that database updates can be initially checked once in 2-3 days, and, at later phase, the checks can be performed weekly.

Figure 7:
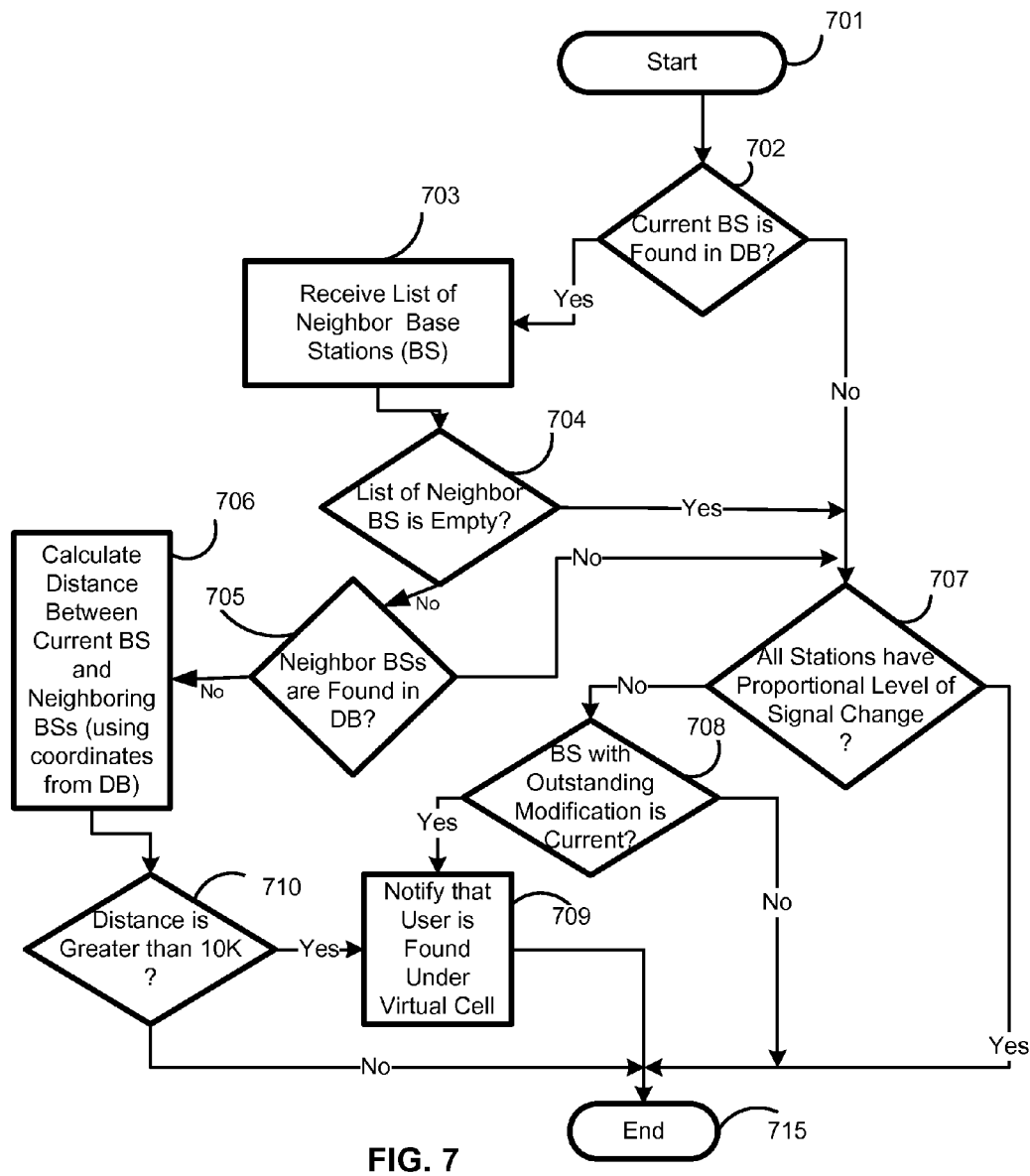
FIG. 7 illustrates a flowchart for identification of a fake base station (BS), in accordance with the exemplary embodiment.

A flowchart for identification of a fake base station (BS) is depicted in FIG. 7. The process starts in step 701 when a call is received. The process checks if a current BS is found in a database. If the BS is not found, the process moves to step 707 and checks if all stations have a proportional level of a signal change.

If they do, the process stops in step 715. Otherwise, the process determines, in step 708, if the BS with outstanding modification is current. If the BS is current, the notification that the user is found under virtual cell is generated in step 709. Otherwise, the process ends in step 715. If, in step 702, the current BS is found in the database, the process acquires a list of neighbor base stations in step 703. Then, in step 704, the process checks if the list of neighbor BSs is empty. If the list is empty, the process moves to step 707. Otherwise, the process moves to step 705 and checks if the neighbor BSs are found in the database. If the BSs are not found, the process moves to step 770.

If the neighbor (i.e., adjacent) BSs are found, the process calculates a distance between the current BS and neighbor BSs using coordinates from the database in step 706. Then, in step 710, the process checks if the distance is greater than 10000 m. the distance is shorter, the process ends in step 715. Otherwise, if the distance is greater, the process moves to step 709, where the notification that the user is found under virtual cell is generated.

Figure 10:
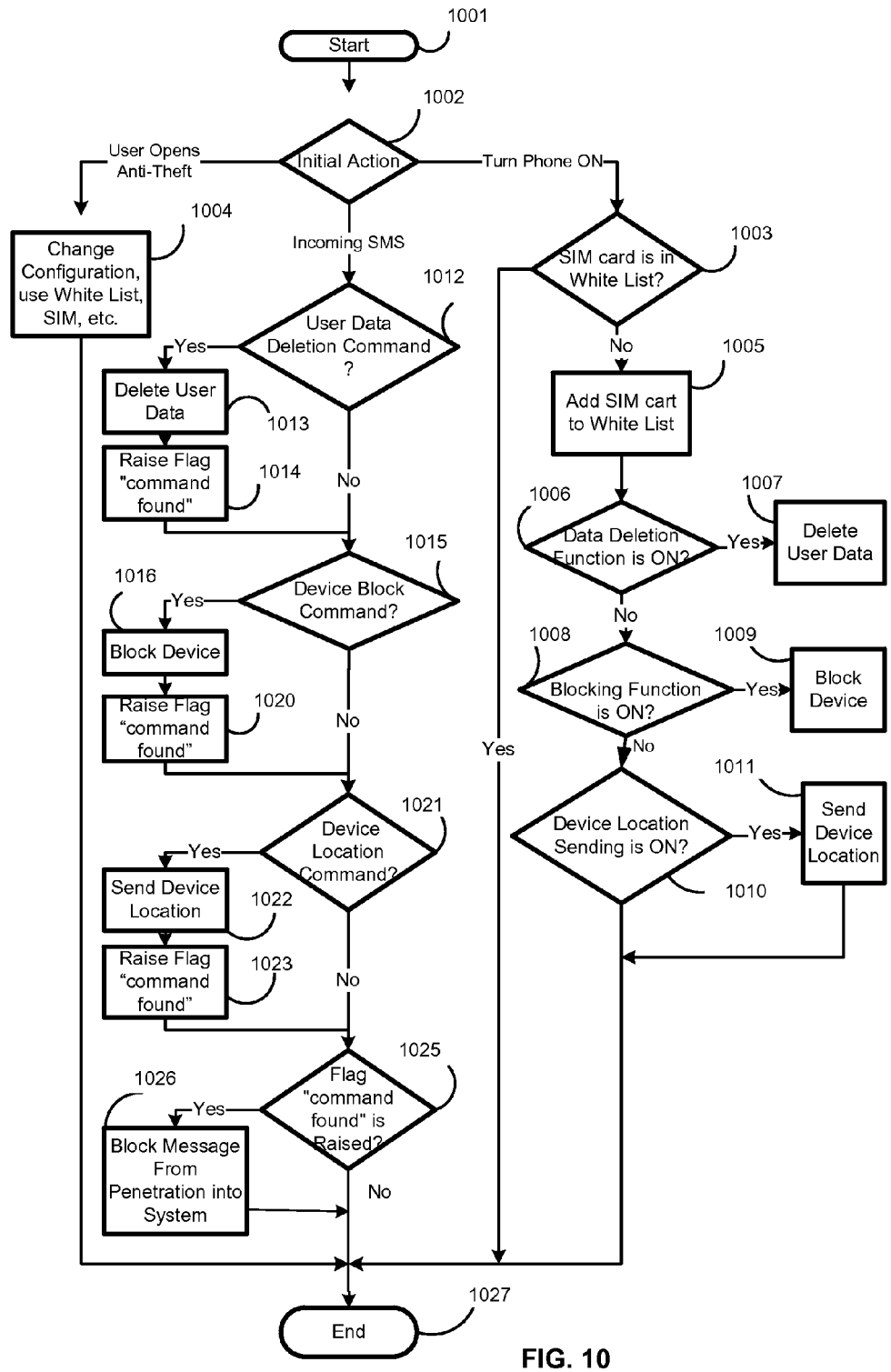
FIG. 10 illustrates a flow chart of security processing of the phone in accordance with the exemplary embodiment.

A flow chart of remote security processing of the phone in accordance with the exemplary embodiment is illustrated in FIG. 10. This is a situation when a user phone is lost or stolen. A process is started in step 1001, and a scenario is chosen in step 1002. If the initial action is opening of anti-theft application by a user, then they can change configuration, edit whitelist, etc. in step 1004. Subsequently the process (i.e., user session) ends in step 1027.

If the entry point in step 1002 is an incoming SMS, then the system detects user data deletion command in step 1012. If the user data deletion command is detected, the user data is deleted in step 1013. Subsequently, the "command found" flag is raised in step 1014. Then, a device block command is detected in step 1015. If the command is detected, the device is blocked in step 1016. Subsequently, the "command found" flag is raised in step 1020. Then, the process moves to step 1021, where device location command is detected.

If the user data deletion command is not detected in step 1012, the process moves directly to step 1015. If the device location command is detected in step 1021, the device location is sent in step 1022. Subsequently, the "command found" flag is raised in step 1023. Then, the process moves to step 1025. Otherwise, the process moves to step 1025 directly from step 1021.

If the flag "command found" is detected in step 1025, the message is blocked from penetration into the mobile device system in step 1026. Then, the process ends in step 1027. If the entry point is the phone turning on, the process checks, if the SIM card is in the whitelist in step 1023. If the SIM card is in the whitelist, the process terminates user session in step 1027. Otherwise, the process checks if the data deletion function is on in step 1006. If the function is on, the user data is deleted in step 1007.

Otherwise, the process checks if the blocking function is on in step 1008. If the function is on, the device is blocked in step 1009. Otherwise, the process checks if device location function is on in step 1010. If the function is on, the device location is sent in step 1011. Subsequently, the process is ended in step 1027.

7. User Data Cleaning.

The user data cleaning is needed in order protect personal data in case of loss of the phone. The exemplary embodiment offers two options (depending on the version of the platform) for deleting user data in order to avoid it being compromised, if the device is lost. Starting with Android version 2.2 a special proprietary API is used to reset the phone to factory settings with full deletion of user data from the phone's memory. For versions earlier than 2.2 (and for others, if the user does not allow the use of the API to reset the phone to factory settings), all available system Content Providers (an Android component type) are used for the deletion of contacts, SMSs, and calls log. This makes it possible to delete personal data for a wide range of devices.

Accordingly, the system employs two alternative methods to delete user data from a mobile device: by using the device administrator API and by direct deletion of data from all available content providers. The administrator API allows for more complete cleaning. Note that manual deletion does not allow for deletion of third-party application data because file access is limited on an unlocked phone.

8. Phone Locking.

The exemplary embodiment supports two options (depending of the platform version) for locking the lost phone in order to prevent unauthorized access. Starting with Android version 2.2, the proprietary API is used to lock the phone by setting a system password for screen activation. Such integration with the system makes it impossible to circumvent the password without external intrusion into the device's memory by, for example, "jail breaking".

For versions earlier than 2.2 (and for others, if the user does not allow using API to change the unlock password), all user interactions with the device are intercepted to lock access to the device (clicks or touches on the screen and buttons) using a special function, which makes it impossible to use the screen until the password is entered.

Accordingly, the system employs the two options for locking the phone: by setting a password to unlock the device when user switches on the screen and interception of all user screen (button) clicks and touches using a special function, i.e., a special user interface window (a system notification, which the user cannot easily close).

9. Controlling SMS

The exemplary embodiment uses Android API functions for incoming SMS processing by external applications before they are allowed to enter incoming folder for controlling SMS. When messages are received, the device performs certain actions. The messages are not saved and they cannot be read by the user. Therefore, the Theft Protection module makes it possible to determine the device's coordinates, to lock it and delete the user's data from the lost phone remotely while in "quiet mode" and using only the subscriber's cellular number served by the device. The system executes certain actions when an SMS message with pre-set commands is received and hides the message from the user.

The above functionality is needed for controlling a device that is not physically accessible (i.e., stolen or lost). Thus, user personal data can be deleted remotely.

10. Response to SIM Replacement.

According to the exemplary embodiment, the system uses information about the inserted SIM card to automatically detect that the device has been stolen. This verification is based on the user's whitelist of SIM cards that can be used with the device.

The SIM cards in this list are primarily identified by IMSI—a unique international subscriber's identifier in the GSM, UMTS, and CDMA networks. The user can identify the SIM card by phone numbers bound to them. This information is gathered from a special SIM record which is optionally supplied by the cellular operator. Therefore, in some cases, it is impossible to identify the SIM card by its phone number. In such cases, the SIM card can only be identified by IMSI.

When detecting a SIM card that is not recorded in the whitelist, the program considers the device to be stolen and performs actions pre-defined by the user. The system sends an SMS with the device coordinates to a pre-set number and locks the device or deletes user data from it. New SIM cards can be added to the list by the user, if the system is previously advised that the next SIM card is a trusted one.

Accordingly, the system detects if the device is being used by a person other than the device's owner (i.e., when a SIM card that is not the user's SIM card is inserted into the device). The information about the user's SIM cards is entered by advising the program that a new trusted SIM card is going to be inserted.

11. Monitoring Other Application Activities by Resource Availability.

One of the available methods to monitor other applications activities is based on the fact that some system resources can be used by one application only at one time. Such resources include the microphone, for example. When a third-party application begins recording audio, another application will be rejected, if it requests the system recording function.

Thus, microphone use can be determined by the fact of its unavailability. The exemplary control application periodically requests system access to the microphone (and it is immediately released). If access is unavailable, the user is notified that audio is being recorded.

Accordingly, the system detects the use of the device's functions by of other applications attempting to use these functions resulting in their immediate release and processing situations when the system rejects the request.

12. Current Status Verification and Filtering Baseband Processor Commands.

According to the exemplary embodiment, implementation of the phone stack is performed from the application processor side and includes an interface (Radio Interface Layer, RIL) ensuring an abstraction level between the telephony service and the baseband processor. In order to detect encryption between the phone and the base station, as well as filtering activity responsible for locking and injecting new AT commands, a program layer is used at the level between the AT command transmission channel and the lower level of the phone stack.

A verification application refers to the channel of command exchange with the baseband processor. The application requires renaming the real device (/dev/smd0) and creating a new one with the name of the real device. After that, the program unlocks the real device and it becomes possible for it to emulate data transmission channel after restarting the RIL processor (rild—Radio Interface Layer Daemon).

Accordingly, the system detects encryption between the phone and the base station by querying the baseband processor using the respective AT command(s) when an incoming or outgoing call is initiated to warn the device (e.g., Android) operation system user that no encryption is being used.

Figure 9:
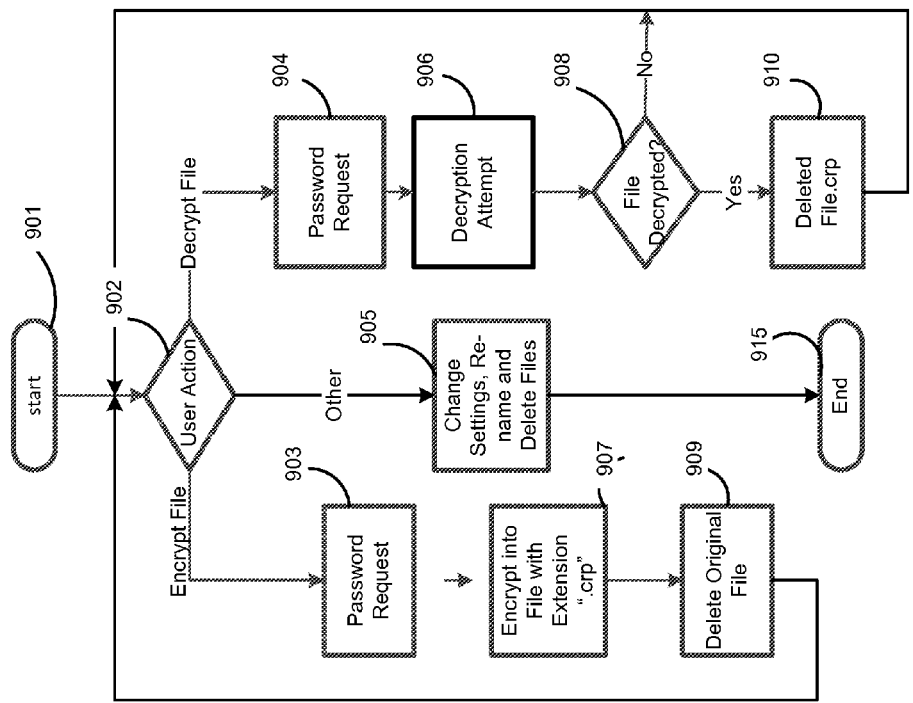
FIG. 9 illustrates a flow chart of detection of encryption/decryption.

FIG. 9 illustrates a flow chart of encryption of files, in accordance with the exemplary embodiment. The process start in step 901 and user selects an action in step 902. The action can be either encryption or decryption of a file. If the user chooses to encrypt the file, a password is requested in step 903. Then, the file is encrypted into a file with extension *.crp in step 907. Subsequently, the original file is deleted in step 903, after which the process wait for another user action.

If the user action, in step 902, is decryption of a file, a password is requested in step 904. A decryption attempt is made in step 906. Then, in step 908, the process determines if the file is actually decrypted. If the file is decrypted, the encrypted file with extension *.crp is deleted in step 910. Otherwise, the process goes to the next user action in step 902. If the user executes other action (not encryption/decryption) in step 902, this other action (i.e., change of setting, renaming and/or deletion of files, etc.) is executed in step 905, after which the process (user session) ends in step 915. User applications access user data through controlled AV access, but controlling access to files on an external medium, like an SD card, is not possible (since they are not distinguishable from other files, which the applications themselves store there). Therefore, the user is given an option for safe storage of the files.

13. Checking Microphone and Baseband Processor Current Status in Order to Detect Hidden Audio Transmission.

According to the exemplary embodiment, a mobile device is capable of unauthorized sending of data in response to an external controlling command (for example, from a mobile service provider or from a malicious source). The baseband processor is periodically queried in order to determine if there are any active calls or auxiliary services initiated by the network using AT commands and in order to check its current status and detect connections hidden from the user. The microphone is checked on the subject of sending data to the baseband processor to control its current status. The user is notified if there are any unauthorized connections.

14. Exemplary Eavesdropping Protection Module Operation

The eavesdropping protection module 103 may need to verify that the virtual base station can mask itself as a normal BS, and can therefore try to do it by changing its location ideantification (LAC—Location Area Code). Thus, the virtual BS can be identified by tracking a change in the LAC without a change of its primary identifier (CID—Cell ID). Real base stations can also change their LAC, for example, when network topology is changed by the mobile operator.

Figure 15:
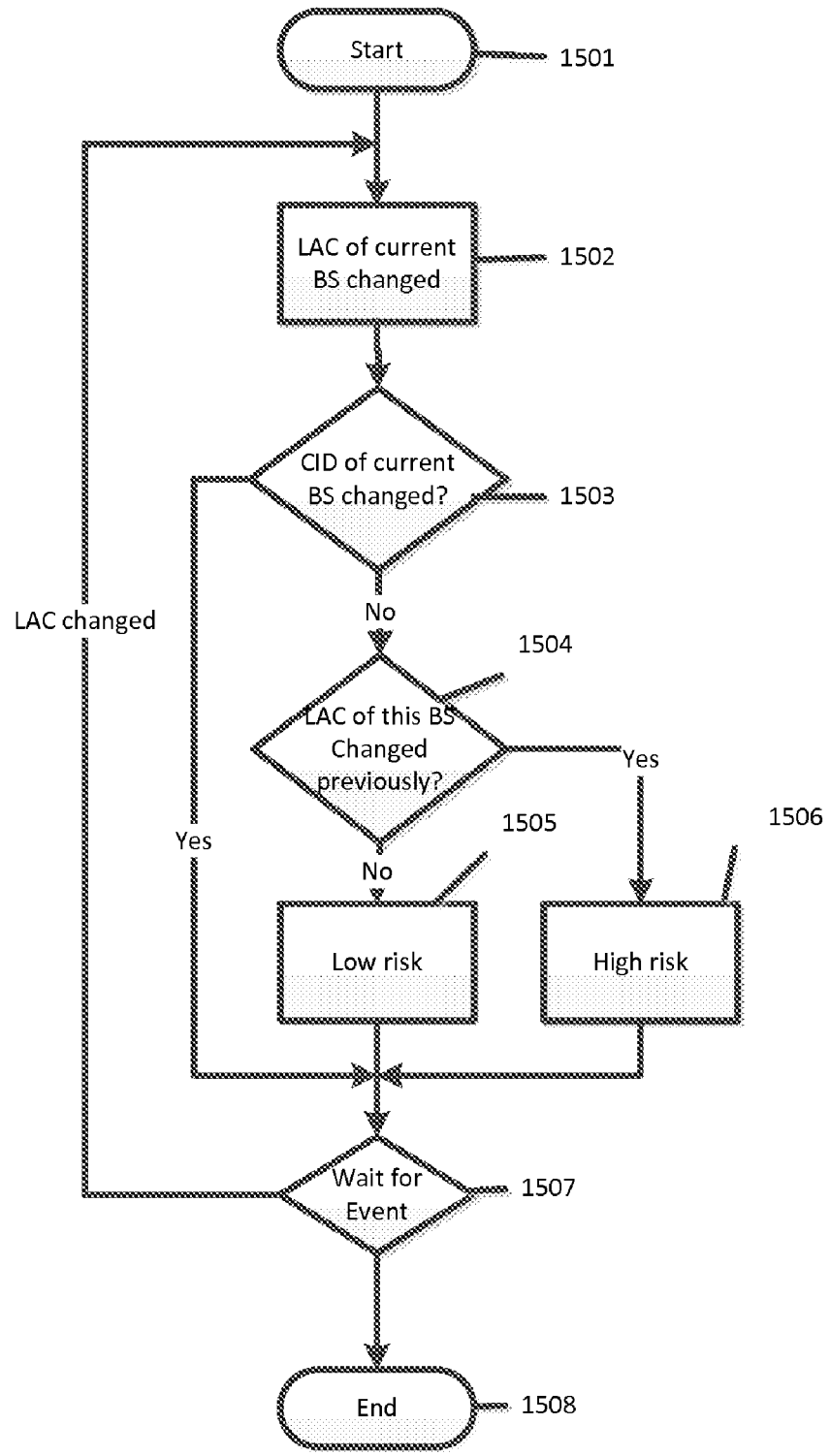

As shown in FIG. 15, after starting (step 1501) the algorithm detects a change in the LAC of the current base station (to which the user is connected at the moment) (step 1502). The algorithm checks if the Cell ID also changed (step 1503). If it did, then there is no danger. Otherwise, the algorithm checks if there were prior changes to the LAC for this Cell ID (step 1504). If it is a first change, then the risk is low (step 1505), otherwise, the risk is high (step 1506). The algorithm waits for the next event (step 1507), or ends in step 1508.

Figure 14:
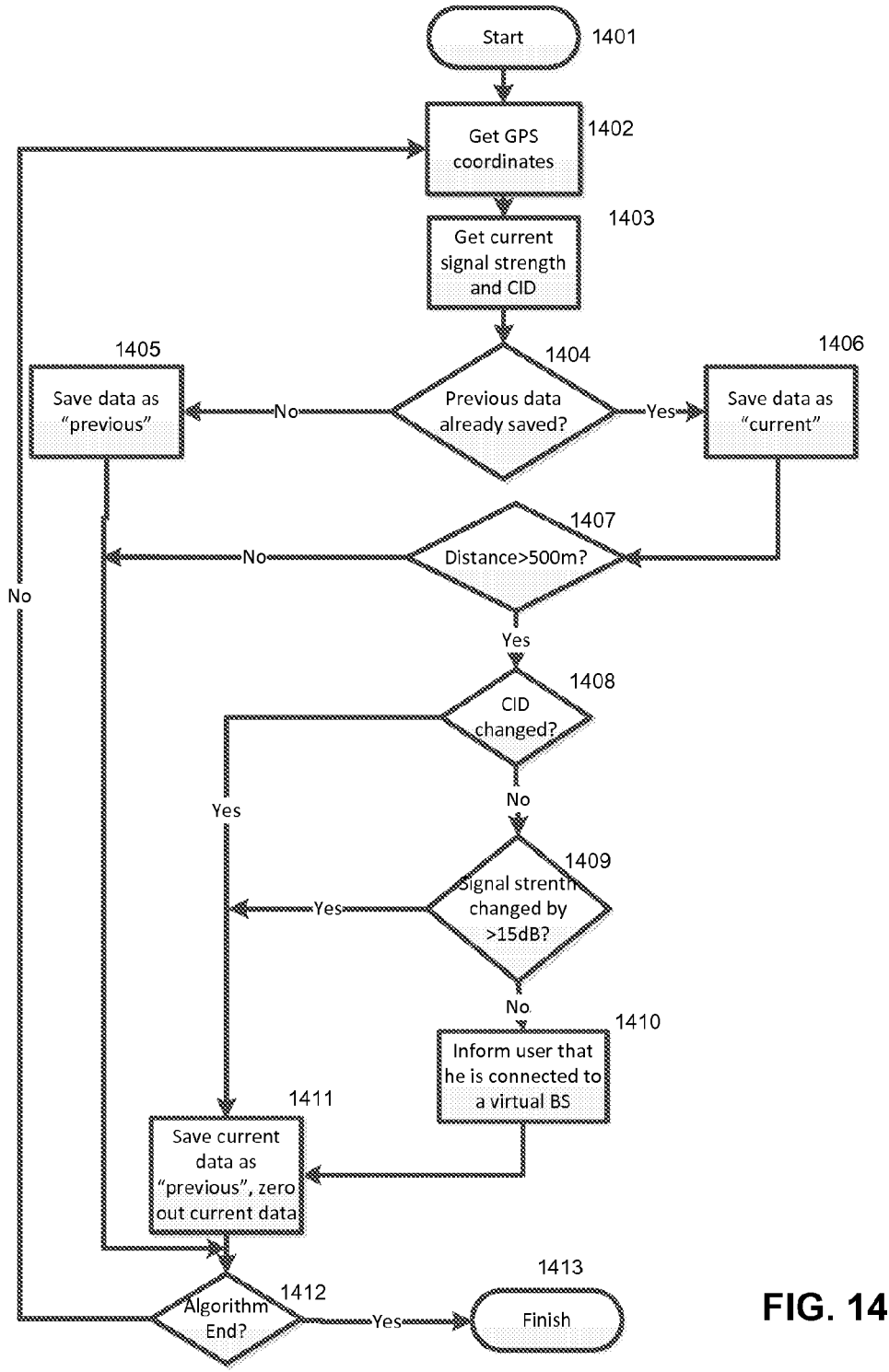
FIGS. 14-15 illustrate detection of a virtual Base Station.

FIG. 14 illustrates the algorithm. The algorithm starts in step 1401. In step 1402, GPS coordinates are received. In step 1403, signal strength and current CID are received. In step 1404, the algorithm checks if prior data (LAC and CID) are stored. If yes, then step 1406 is performed, otherwise, step 1405 is performed (LAC and CID data are stored).

In step 1406, current LAC and CID are stored. In step 1407, distance between prior data and current data is calculated. If the distance is less than 500 m, then in step 1412, the algorithm waits for new data, which will then be stored as current, and another verification performed. Otherwise, in step 1408, the algorithm checks if the CID has changed. If yes, then, in step 1411, current data become prior data, and new data is sought. If no, then, in step 1009, signal strength is compared. If the difference in signal strength from prior data is greater than 15 dB, then step 1411 is performed, otherwise, in step 1410, the user is informed that he is likely connected to a virtual BS.

In step 1412, the algorithm checks if it should continue, otherwise, in step 1413, the algorithm ends.

The system, in accordance with the exemplary embodiment, checks a current status of the microphone and baseband processor to detect an unauthorized operation by means of external controlling commands and notification of the user about hidden audio transmission.

The exemplary embodiment can be implemented by an executable module or modules with a plurality of instructions that are stored on a non-transitory machine readable medium and executed on the processor of the mobile device. Alternatively, the instructions can be implemented at a server location, or can be hosted in a combination of both locations—mobile device and a server.

Note that Google Android is particularly optimized for Java programming. C++ code is executed on the level of the LINUX kernel, which has a reduced functionality in Android, for reasons of security and a desire to minimize computational burden. Most of the interactions under Android occur on the level of libraries and applications in the Java Dalvik Virtual Machine. Since C++ code is executed on the LINUX kernel level (i.e., below Java code), the most complex (and closest to the GSM/3G-modem) algorithms for security and protection are written in C++.

Java code is easily recovered from .class files, which contain compiled Java programs. This makes it easily accessible for malicious coders, who can identify weak spots and vulnerabilities in the code, including any proprietary code. Obfuscation is sometimes used to make analysis more difficult, though with limited success. In C++, which is not particularly optimized for portability, the code is machine-dependent and very complex. It cannot be disassembled mathematically. Obscuring the code has the following solution: Java code has C++ code embedded in it, compiled for the particular processor. Many mobile phones use ARM microprocessors. What results is machine code which is extremely difficult to decompile/disassemble. Therefore, the most critical parts of the code, which need to be obscured, can be written in C++, compiled, and used as libraries (in a ".so" format, typical for UNIX/LINUX). These portions are then "attached" to Java through the JNI (JavaNativeInterface) interface.

As such, the following components are preferably written in C++: the engine (i.e., programming logic) of the anti-virus module, the engine of the anti-spam module, and the engine of the protection from eavesdropping module.

Normal compiled languages have source code compiled into object directly, which is then understandable by the processor. Java compiles Java code on a special Java Virtual Machine, which represents an intermediate step between the byte code and the processor. Java can be used for a flexible security system, since program execution is entirely controlled by the VM. On the other hand, the addition of the JVM layer can significantly affect performance. One factor affecting performance is the amount of used memory, since many mobile phones have a strictly limited amount of RAM, and exceeding the limit can crash the application. Java and C++ use different approaches to memory management, with Java being less efficient.

Time is another factor affecting performance. Compiled C++ code is stored in binary format, and is executed directly. Java code needs to be converted to byte code, and then to object code using the JVM. The JVM, in turn, is executed by the processor. Byte code execution is done using emulation, which makes application response much slower. Since all Java functions go through the JVM, the response time of the functions is 2-3 times slower, which affects application performance significantly.

The antivirus engine, therefore, is written in C++, since controlling the third party applications (and verification of their source code) requires considerable resources for data processing and RAM utilization.

The anti-spam module implements these functions natively: finding the operator based on the number, providing the results of the check based on the number and the SMSC. Java code performs SMS intercept and using JNI (Java Native Interface) invokes the verification of the SMS in the native code. Also, all interactions with the user and remaining checks of the messages (e.g., whitelist/blacklist, etc.) are done using Java code.

The anti-virus module implements the following natively: processing of application activity for those applications that are under control, adding shell methods to classes.dex and replacement of calls to them, changes to AndroidManifest.xml, and checking if new SMS messages are under control. Java code performs the rest of the functions: establishing control over applications, obtaining and unpacking of *.apk file, calling of processing means through JNI, packing of the changed/edited application to *.apk file, signing of the new *.apk file with a generated signature, requests to user for installation/removal of the applications. Other interaction with the user and receiving of messages from applications under control is done using Java code.

The anti-eavesdropping module implements the following natively: base station verification, and search for base stations in the database. The latter is called through JNI. Also, a daemon-intermediary between the GSM/3G-modem and the OS is native. The daemon provides protection from low-level threats relating to phone calls, generation of fake calls, low-level attempts to send SMS messages and generation of fake SMS messages. It also checks if the GSM signal is encrypted. Java code is invoked by the daemon through sockets. Java code functions include interaction with the user, receiving messages from application under control, etc.

Figure 12:
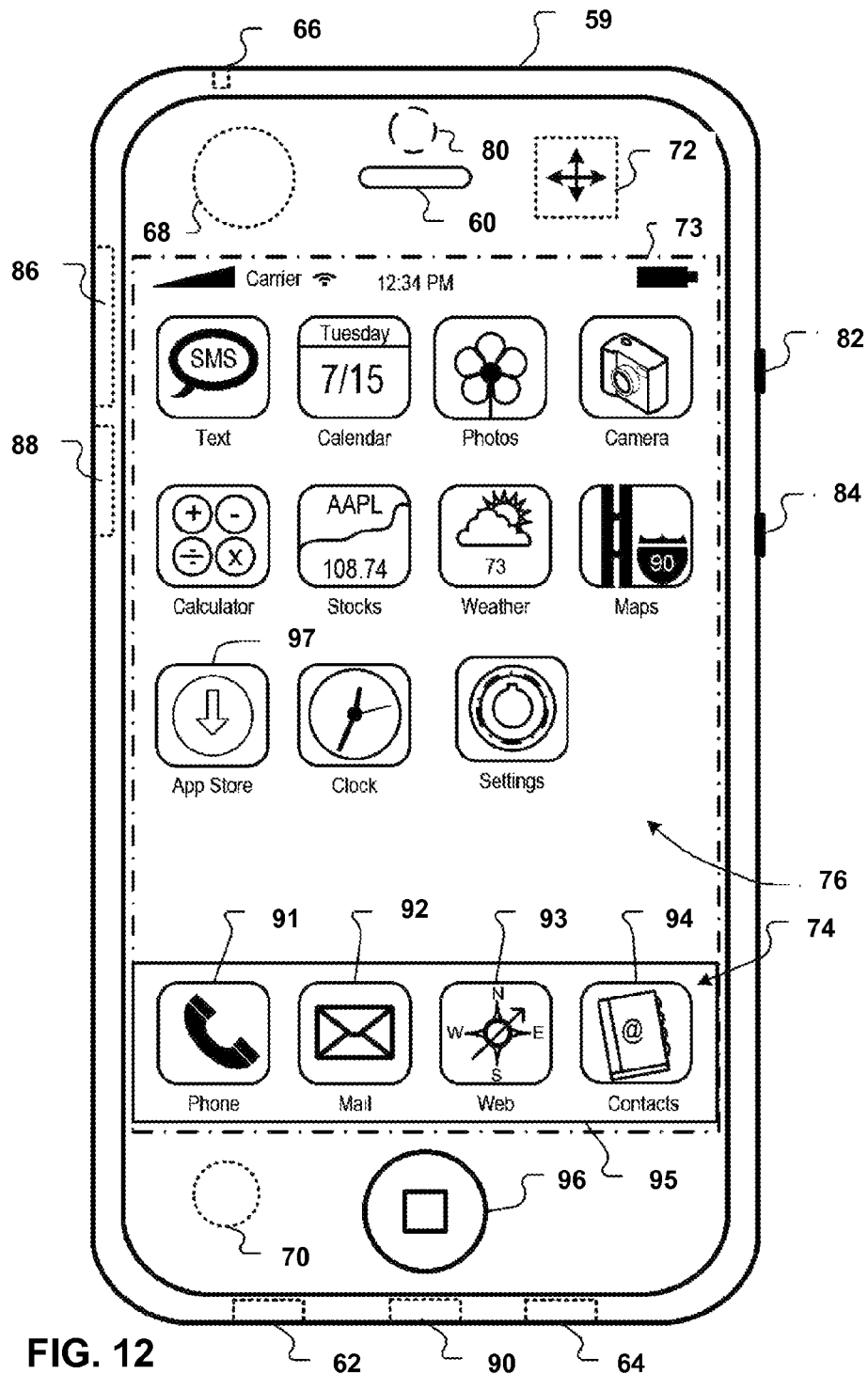
FIG. 12 is a block diagram of an exemplary mobile device that can be used in the invention.

FIG. 12 is a block diagram of an exemplary mobile device 59 on which the invention can be implemented. The mobile device 59 can be, for example, a personal digital assistant, a cellular telephone, a network appliance, a camera, a smart phone, an enhanced general packet radio service (EGPRS) mobile phone, a network base station, a media player, a navigation device, an email device, a game console, or a combination of any two or more of these data processing devices or other data processing devices.

In some implementations, the mobile device 59 includes a touch-sensitive display 73. The touch-sensitive display 73 can implement liquid crystal display (LCD) technology, light emitting polymer display (LPD) technology, or some other display technology. The touch-sensitive display 73 can be sensitive to haptic and/or tactile contact with a user.

In some implementations, the touch-sensitive display 73 can comprise a multi-touch-sensitive display 73. A multi-touch-sensitive display 73 can, for example, process multiple simultaneous touch points, including processing data related to the pressure, degree and/or position of each touch point. Such processing facilitates gestures and interactions with multiple fingers, chording, and other interactions. Other touch-sensitive display technologies can also be used, e.g., a display in which contact is made using a stylus or other pointing device.

In some implementations, the mobile device 59 can display one or more graphical user interfaces on the touch-sensitive display 73 for providing the user access to various system objects and for conveying information to the user. In some implementations, the graphical user interface can include one or more display objects 74, 76. In the example shown, the display objects 74, 76, are graphic representations of system objects. Some examples of system objects include device functions, applications, windows, files, alerts, events, or other identifiable system objects.

In some implementations, the mobile device 59 can implement multiple device functionalities, such as a telephony device, as indicated by a phone object 91; an e-mail device, as indicated by the e-mail object 92; a network data communication device, as indicated by the Web object 93; a Wi-Fi base station device (not shown); and a media processing device, as indicated by the media player object 94. In some implementations, particular display objects 74, e.g., the phone object 91, the e-mail object 92, the Web object 93, and the media player object 94, can be displayed in a menu bar 95. In some implementations, device functionalities can be accessed from a top-level graphical user interface, such as the graphical user interface illustrated in the figure. Touching one of the objects 91, 92, 93 or 94 can, for example, invoke corresponding functionality.

In some implementations, the mobile device 59 can implement network distribution functionality. For example, the functionality can enable the user to take the mobile device 59 and its associated network while traveling. In particular, the mobile device 59 can extend Internet access (e.g., Wi-Fi) to other wireless devices in the vicinity. For example, mobile device 59 can be configured as a base station for one or more devices. As such, mobile device 59 can grant or deny network access to other wireless devices.

In some implementations, upon invocation of device functionality, the graphical user interface of the mobile device 59 changes, or is augmented or replaced with another user interface or user interface elements, to facilitate user access to particular functions associated with the corresponding device functionality. For example, in response to a user touching the phone object 91, the graphical user interface of the touch-sensitive display 73 may present display objects related to various phone functions; likewise, touching of the email object 92 may cause the graphical user interface to present display objects related to various e-mail functions; touching the Web object 93 may cause the graphical user interface to present display objects related to various Web-surfing functions; and touching the media player object 94 may cause the graphical user interface to present display objects related to various media processing functions.

In some implementations, the top-level graphical user interface environment or state can be restored by pressing a button 96 located near the bottom of the mobile device 59. In some implementations, each corresponding device functionality may have corresponding "home" display objects displayed on the touch-sensitive display 73, and the graphical user interface environment can be restored by pressing the "home" display object.

In some implementations, the top-level graphical user interface can include additional display objects 76, such as a short messaging service (SMS) object, a calendar object, a photos object, a camera object, a calculator object, a stocks object, a weather object, a maps object, a notes object, a clock object, an address book object, a settings object, and an app store object 97. Touching the SMS display object can, for example, invoke an SMS messaging environment and supporting functionality; likewise, each selection of a display object can invoke a corresponding object environment and functionality.

Additional and/or different display objects can also be displayed in the graphical user interface. For example, if the device 59 is functioning as a base station for other devices, one or more "connection" objects may appear in the graphical user interface to indicate the connection. In some implementations, the display objects 76 can be configured by a user, e.g., a user may specify which display objects 76 are displayed, and/or may download additional applications or other software that provides other functionalities and corresponding display objects.

In some implementations, the mobile device 59 can include one or more input/output (I/O) devices and/or sensor devices. For example, a speaker 60 and a microphone 62 can be included to facilitate voice-enabled functionalities, such as phone and voice mail functions. In some implementations, an up/down button 84 for volume control of the speaker 60 and the microphone 62 can be included. The mobile device 59 can also include an on/off button 82 for a ring indicator of incoming phone calls. In some implementations, a loud speaker 64 can be included to facilitate hands-free voice functionalities, such as speaker phone functions. An audio jack 66 can also be included for use of headphones and/or a microphone.

In some implementations, a proximity sensor 68 can be included to facilitate the detection of the user positioning the mobile device 59 proximate to the user's ear and, in response, to disengage the touch-sensitive display 73 to prevent accidental function invocations. In some implementations, the touch-sensitive display 73 can be turned off to conserve additional power when the mobile device 59 is proximate to the user's ear.

Other sensors can also be used. For example, in some implementations, an ambient light sensor 70 can be utilized to facilitate adjusting the brightness of the touch-sensitive display 73. In some implementations, an accelerometer 72 can be utilized to detect movement of the mobile device 59, as indicated by the directional arrows. Accordingly, display objects and/or media can be presented according to a detected orientation, e.g., portrait or landscape. In some implementations, the mobile device 59 may include circuitry and sensors for supporting a location determining capability, such as that provided by the global positioning system (GPS) or other positioning systems (e.g., systems using Wi-Fi access points, television signals, cellular grids, Uniform Resource Locators (URLs)). In some implementations, a positioning system (e.g., a GPS receiver) can be integrated into the mobile device 59 or provided as a separate device that can be coupled to the mobile device 59 through an interface (e.g., port device 90) to provide access to location-based services.

The mobile device 59 can also include a camera lens and sensor 80. In some implementations, the camera lens and sensor 80 can be located on the back surface of the mobile device 59. The camera can capture still images and/or video.

The mobile device 59 can also include one or more wireless communication subsystems, such as an 802.11b/g communication device 86, and/or a BLUETOOTH communication device 88. Other communication protocols can also be supported, including other 802.x communication protocols (e.g., WiMax, Wi-Fi, 3G, LTE), code division multiple access (CDMA), global system for mobile communications (GSM), Enhanced Data GSM Environment (EDGE), etc.

In some implementations, the port device 90, e.g., a Universal Serial Bus (USB) port, or a docking port, or some other wired port connection, is included. The port device 90 can, for example, be utilized to establish a wired connection to other computing devices, such as other communication devices 59, network access devices, a personal computer, a printer, or other processing devices capable of receiving and/or transmitting data. In some implementations, the port device 90 allows the mobile device 59 to synchronize with a host device using one or more protocols, such as, for example, the TCP/IP, HTTP, UDP and any other known protocol. In some implementations, a TCP/IP over USB protocol can be used.

Figure 13:
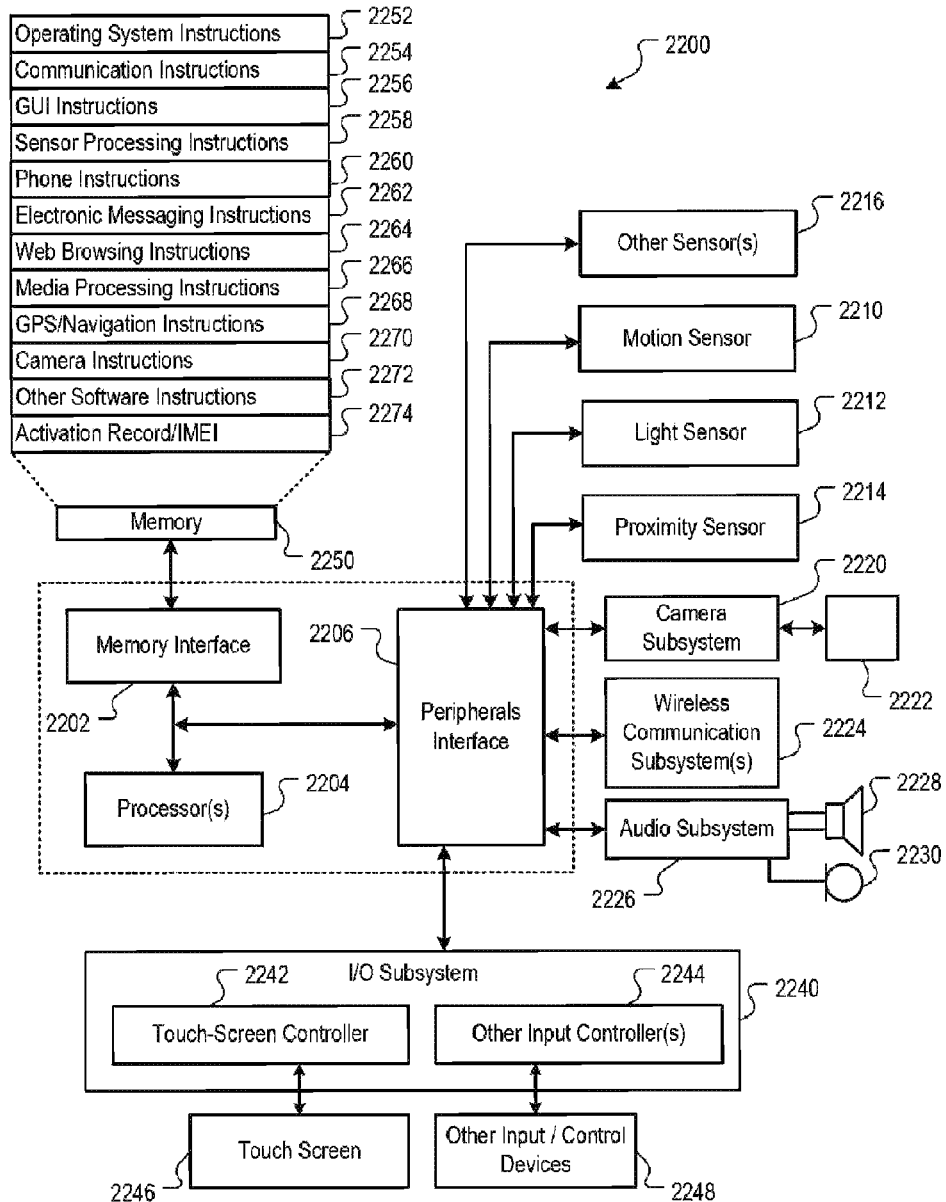
FIG. 13 is a block diagram of an exemplary implementation of the mobile device.

FIG. 13 is a block diagram 2200 of an example implementation of the mobile device 59. The mobile device 59 can include a memory interface 2202, one or more data processors, image processors and/or central processing units 2204, and a peripherals interface 2206. The memory interface 2202, the one or more processors 2204 and/or the peripherals interface 2206 can be separate components or can be integrated in one or more integrated circuits. The various components in the mobile device 59 can be coupled by one or more communication buses or signal lines.

Sensors, devices and subsystems can be coupled to the peripherals interface 2206 to facilitate multiple functionalities. For example, a motion sensor 2210, a light sensor 2212, and a proximity sensor 2214 can be coupled to the peripherals interface 2206 to facilitate the orientation, lighting and proximity functions described above. Other sensors 2216 can also be connected to the peripherals interface 2206, such as a positioning system (e.g., GPS receiver), a temperature sensor, a biometric sensor, or other sensing device, to facilitate related functionalities.

A camera subsystem 2220 and an optical sensor 2222, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 2224, which can include radio frequency receivers and transmitters and/or optical (e.g., infrared) receivers and transmitters. The specific design and implementation of the communication subsystem 2224 can depend on the communication network(s) over which the mobile device 59 is intended to operate. For example, a mobile device 59 may include communication subsystems 2224 designed to operate over a GSM network, a GPRS network, an EDGE network, a Wi-Fi or WiMax network, and a BLUETOOTH network. In particular, the wireless communication subsystems 2224 may include hosting protocols such that the device 59 may be configured as a base station for other wireless devices.

An audio subsystem 2226 can be coupled to a speaker 2228 and a microphone 2230 to facilitate voice-enabled functions, such as voice recognition, voice replication, digital recording, and telephony functions.

The I/O subsystem 2240 can include a touch screen controller 2242 and/or other input controller(s) 2244. The touch-screen controller 2242 can be coupled to a touch screen 2246. The touch screen 2246 and touch screen controller 2242 can, for example, detect contact and movement or break thereof using any of multiple touch sensitivity technologies, including but not limited to capacitive, resistive, infrared, and surface acoustic wave technologies, as well as other proximity sensor arrays or other elements for determining one or more points of contact with the touch screen 2246.

The other input controller(s) 2244 can be coupled to other input/control devices 2248, such as one or more buttons, rocker switches, thumb-wheel, infrared port, USB port, and/or a pointer device such as a stylus. The one or more buttons (not shown) can include an up/down button for volume control of the speaker 2228 and/or the microphone 2230.

In one implementation, a pressing of the button for a first duration may disengage a lock of the touch screen 2246; and a pressing of the button for a second duration that is longer than the first duration may turn power to the mobile device 59 on or off. The user may be able to customize a functionality of one or more of the buttons. The touch screen 2246 can, for example, also be used to implement virtual or soft buttons and/or a keyboard.

In some implementations, the mobile device 59 can present recorded audio and/or video files, such as MP3, AAC, and MPEG files. In some implementations, the mobile device 59 can include the functionality of an MP3 player. The mobile device 59 may, therefore, include a 32-pin connector that is compatible with the MP3 player. Other input/output and control devices can also be used.

The memory interface 2202 can be coupled to memory 2250. The memory 2250 can include high-speed random access memory and/or non-volatile memory, such as one or more magnetic disk storage devices, one or more optical storage devices, and/or flash memory (e.g., NAND, NOR). The memory 2250 can store an operating system 2252, such as Darwin, RTXC, LINUX, UNIX, OS X, ANDROID, IOS, WINDOWS, or an embedded operating system such as VxWorks. The operating system 2252 may include instructions for handling basic system services and for performing hardware dependent tasks. In some implementations, the operating system 2252 can be a kernel (e.g., UNIX kernel).

The memory 2250 may also store communication instructions 2254 to facilitate communicating with one or more additional devices, one or more computers and/or one or more servers. The memory 2250 may include graphical user interface instructions 2256 to facilitate graphic user interface processing including presentation, navigation, and selection within an application store; sensor processing instructions 2258 to facilitate sensor-related processing and functions; phone instructions 2260 to facilitate phone-related processes and functions; electronic messaging instructions 2262 to facilitate electronic-messaging related processes and functions; web browsing instructions 2264 to facilitate web browsing-related processes and functions; media processing instructions 2266 to facilitate media processing-related processes and functions; GPS/Navigation instructions 2268 to facilitate GPS and navigation-related processes and instructions; camera instructions 2270 to facilitate camera-related processes and functions; and/or other software instructions 2272 to facilitate other processes and functions.

Each of the above identified instructions and applications can correspond to a set of instructions for performing one or more functions described above. These instructions need not be implemented as separate software programs, procedures or modules. The memory 2250 can include additional instructions or fewer instructions. Furthermore, various functions of the mobile device 59 may be implemented in hardware and/or in software, including in one or more signal processing and/or application specific integrated circuits.

Having thus described a preferred embodiment, it should be apparent to those skilled in the art that certain advantages of the described method and apparatus have been achieved.

It should also be appreciated that various modifications, adaptations, and alternative embodiments thereof may be made within the scope and spirit of the present invention. The invention is further defined by the following claims.

What is claimed is:

1. A mobile communication device security system, the system comprising:
a mobile communication device;
an operating system running on the mobile communication device;
security modules installed under the mobile device operating system,
wherein each security module includes components that implement some functionality natively and components that implement some functionality non-natively;
the security modules comprises at least an anti-spam module and an anti-virus module;
wherein the anti-virus module performs natively any of the following:
(a) adding methods to classes.dex and replacement of their calls, (b) adding classes to classes.dex, and (c) replacing classes in classes.dex;
wherein the anti-virus module also performs any of the following: (d) processing of applications over which control is being established, (e) receiving and unpacking of distributive files, (f) packing of the changed/edited applications to distributive files, (g) signing of the new distributive file with a generated signature, (h) requests to user for installation/removal of the applications, and (i) changes to AndroidManifest.xml;
wherein the anti-spam module performs any of the following: (j) SMS intercepts, (k) validation of SMS sender's number, (l) interactions with the user, and (m) whitelist/blacklist checks of the SMS.

2. The system of claim 1, wherein the security module performs any of:
control of third-party applications;
verification of the current system time based on a timestamp of the SMS;
protection against fake contact name of the SMS sender;
collection of data about fraudulent and spam SMS messages;
sending of SOS SMSs and e-mails with a pre-set text and geographic coordinates of the mobile device;
deletion of user data from the mobile device remotely;
locking the mobile device until the password is entered;
filtering calls or SMS messages; and
checking status of a microphone or a baseband processor.

3. The system of claim 2, wherein the control of third-party applications comprises re-assembling the applications, embedding custom code into the applications and replacing calls of controlled functions by special methods.

4. The system of claim 2, wherein the validation of SMS sender number by verifying that the sender number and the SMS center (SMSC) number specified in message Protocol Description Unit (PDU) belong to the same Mobile Network Code (MNC).

5. The system of claim 2, wherein the validation of SMS sender number by verifying that the sender number is not an alphanumeric string (Type Of Number, TON, in PDU is alphanumeric, value 5) with a correct phone number recorded in it.

6. The system of claim 2, wherein the protection against fake contact name of the SMS sender by verifying if a sender alphanumeric address is the same as any transliteration variant of any word subset of a displayed name of any contact.

7. The system of claim 2, wherein the collection of data about fraudulent and spam SMS messages comprises enabling users to complain about unwanted messages using a collection component installed on the mobile device.

8. The system of claim 2, wherein the deletion of user data from the mobile device remotely comprises using direct deletion of data from all available content providers.

9. The system of claim 1, wherein the security modules further comprise an anti-eavesdropping module that performs any of the following:
(a) processing of system calls that are already under control, (b) interaction with the user, and (c) receiving messages from application under control;
wherein the anti-eavesdropping module also performs any of the following: (a) base station verification, (b) search for base stations in the database, (c) service provider connection verification, (d) intermediation between the GSM/3G-modem and phone software, and (e) intermediation between the GSM/3G-modem and phone firmware.

10. The system of claim 9, wherein the filtering calls and SMS messages comprises filtering respective attention (AT) commands from a baseband processor.

11. The system of claim 9, wherein the checking of status of a microphone or a baseband processor comprises detection of an unauthorized operation by means of external controlling commands and notification of a user about hidden audio transmissions or about a hidden connection to a mobile service provider.

12. The system of claim 9, wherein the verification of connection and/or validity of a base station by acquiring coordinates of a current and adjacent base stations in a database and comparing their locations and a certain maximum distance from each other, or based on a predefined time that elapsed without the user switching to a different base station while the user is moving.

13. The system of claim 9, wherein the verification of connection and/or validity of a base station by analyzing a proportion of the signal level change for the current and adjacent base stations, or by requesting from a mobile network operator to verify that the user's telephone is connected to the mobile network.

14. The system of claim 9, wherein the verification of validity of a base station comprises detecting changes in Mobile Country Code (MCC) or Mobile Network Code (MNC) or Location Area Code (LAC), while a user has not crossed a country border or user has not changed a service provider or base station Cell ID has not changed.

15. The system of claim 9, wherein the security module detects no encryption between the mobile device and a base station.

16. The system of claim 9, wherein the anti-eavesdropping module registers a received SMS message using an AT command from the baseband processor and then waits to receive the SMS message on an application level.

17. The system of claim 9, wherein the anti-eavesdropping module sends out the SMS message on an application level and then registers an outgoing SMS message using an AT command from the baseband processor.

18. The system of claim 1, wherein the security module performs detection of the mobile device being used by a person other than a device owner, when a third-party Subscriber Identification Module (SIM) card is inserted into the device.

19. The system of claim 1, wherein (d), (e), (f), (g) and (h) are performed non-natively.

20. The system of claim 1, wherein the mobile communication device is a smartphone.

21. The system of claim 1, wherein the mobile communication device operating system is Android.

22. The system of claim 1, wherein the validation by the anti-spam module uses any of the following: (a) finding a mobile operator based on a caller's number, and (b) providing the results of to the user based on the user number and the SMSC number.

23. The method of claim 1, wherein the methods request predefined policies from a base application, thereby allowing or disallowing the system calls to target method according to the policies.

24. The method of claim 1, wherein the distributive file is an *.apk file.

25. The method of claim 1, further comprising verifying current system time of the mobile communication device by comparing the current system time and a value of a TP-SCTS filed in a received SMS message.

26. The system of claim 1, wherein the security modules further comprise any of:
- a hidden contacts processing module;
- an encryption module;
- an anti-theft module; and
- a SOS button utility.

27. A method of providing security for a mobile communication, the method comprising:

installing security modules under an operating system of the mobile device operating system, wherein each security module includes components that implement some functionality natively and components that implement some functionality non-natively;

the security modules include at least an anti-spam module and an anti-virus module;

wherein the anti-virus module performs natively any of the following:

(a) adding methods to classes.dex and replacement of their calls, (b) adding classes to classes.dex, and (c) replacing classes in classes.dex;

wherein the anti-virus module also performs any of the following: (d) processing of applications over which control is being established, (e) receiving and unpacking of distributive files, (f) packing of the changed/edited applications to distributive files, (g) signing of the new distributive file with a generated signature, (h) requests to user for installation/removal of the applications, and (i) changes to AndroidManifest.xml;

wherein the anti-spam module performs any of the following: (j) SMS intercepts, (k) validation of SMS sender's number, (l) interactions with the user, and (m) whitelist/blacklist checks of the SMS.

* * * * *